US012439940B2

(12) United States Patent
Ben Tsen

(10) Patent No.: US 12,439,940 B2
(45) Date of Patent: Oct. 14, 2025

(54) HIGH PRESSURE PROCESSING METHODS FOR READY-TO-DRINK BEVERAGES WITH SOLIDS

(71) Applicant: TZG LLC, Palo Alto, CA (US)

(72) Inventor: Hsiang I Ben Tsen, Palo Alto, CA (US)

(73) Assignee: TZG LLC, Palo Alto, CA (US)

( * ) Notice: Subject to any disclaimer, the term of this patent is extended or adjusted under 35 U.S.C. 154(b) by 465 days.

(21) Appl. No.: 17/974,078

(22) Filed: Oct. 26, 2022

(65) Prior Publication Data

US 2023/0217961 A1 Jul. 13, 2023

Related U.S. Application Data

(60) Provisional application No. 63/267,727, filed on Feb. 9, 2022.

(30) Foreign Application Priority Data

| Jan. 12, 2022 | (CN) | .......................... | 202210032202.9 |
| Jan. 12, 2022 | (CN) | .......................... | 202210032213.7 |
| Jan. 12, 2022 | (CN) | .......................... | 202210032215.6 |
| Jan. 12, 2022 | (CN) | .......................... | 202210033495.2 |

(51) Int. Cl.
| A23L 2/52 | (2006.01) |
| A23B 2/00 | (2025.01) |
| A23L 2/02 | (2006.01) |
| A23L 2/38 | (2021.01) |
| A23L 19/00 | (2016.01) |

(52) U.S. Cl.
CPC ................ *A23L 2/52* (2013.01); *A23B 2/001* (2025.01); *A23L 2/02* (2013.01); *A23L 2/38* (2013.01); *A23L 19/09* (2016.08)

(58) Field of Classification Search
CPC ............ A23B 2/10; A23B 2/103; A23F 3/163
See application file for complete search history.

(56) References Cited

U.S. PATENT DOCUMENTS

| 5,228,394 | A | 7/1993 | Kanda et al. |
| 5,439,703 | A | 8/1995 | Kanda et al. |
| 5,891,505 | A | 4/1999 | Schuman et al. |
| 6,086,936 | A | 7/2000 | Wilson et al. |

(Continued)

FOREIGN PATENT DOCUMENTS

| CN | 114568606 A |   | 6/2022 |
| JP | 2008220254 A | * | 9/2008 |

(Continued)

OTHER PUBLICATIONS

Adrian (https://eatwithadrian.wordpress.com/2015/05/12/konjac-the-potential-boba-killer/, published online May 12, 2015, retrieved May 5, 2025). (Year: 2015).*

(Continued)

*Primary Examiner* — Michele L Jacobson

(74) *Attorney, Agent, or Firm* — Irving M. Fishman

(57) ABSTRACT

A process for the production of a Ready-To-Drink beverage product containing an ingestible fluid containing solid pieces selected from at least one of (a) fruit, (b) crystal boba, and/or (c) tea leaves and subjected to High Pressure Processing (HPP).

10 Claims, 5 Drawing Sheets

(56) References Cited

U.S. PATENT DOCUMENTS

| | | |
|---|---|---|
| 6,426,103 B2 | 7/2002 | Voisin |
| 6,635,223 B2 | 10/2003 | Maerz |
| 7,794,770 B2 | 9/2010 | Sherwood et al. |
| 7,854,950 B2 | 12/2010 | Carroll et al. |
| 8,425,962 B2 | 4/2013 | Palleschi et al. |
| 8,586,121 B2 | 11/2013 | Jacopi et al. |
| 8,771,773 B2 | 7/2014 | Richter |
| 8,997,637 B2 | 4/2015 | LeBaron |
| 9,220,292 B2 | 12/2015 | Jenkins |
| 9,955,716 B1 | 5/2018 | Nordahl |
| 9,956,173 B1 | 5/2018 | Nordahl |
| 10,398,151 B1 | 9/2019 | Lawless et al. |
| 10,517,317 B2 | 12/2019 | Alvarez et al. |
| 10,647,952 B1 | 5/2020 | Lawless et al. |
| 10,986,852 B2 | 4/2021 | O'Donnell |
| 11,154,080 B2 | 10/2021 | Meyer |
| 2019/0254313 A1 | 8/2019 | Liao et al. |

FOREIGN PATENT DOCUMENTS

| | | | |
|---|---|---|---|
| JP | 2020-43774 A | | 3/2020 |
| JP | 2020043774 A | * | 3/2020 |
| TW | M582809 U | | 9/2019 |

OTHER PUBLICATIONS

Zhang et al., J Sci Food Agric 2018; 98: 4160-4167 (Year: 2018).*

Starks; Restaurant Suppl;y Drop; What is Boba? Your introduction to bursting boba vs tapioca balls vs crystal boba; Jan. 15, 2019; cited in International Search Report of Corresponding PCT application PCT/US2022/051091.

PCT/US2020/051091 International Search report and Written Opinion of the International Search Authority of Mar. 14, 2023 (19 Pages).

Balasubramanium et al., Preserving Foods Through High-Pressure Processing; Food Technology Magazine vol. 62, No. 11, Nov. 1, 2008; 13 pages.

Brody et a;. Eds.; The Wiley Encyclopedia of Packaging Technology 2nd Ed (John Wiley and Sons, New York) 1997; Aseptic Packaging pp. 41-45.

Food Security Through High-Pressure Processing May 21, 2020 blog 9 pages retrieved from www.hiperbaric.com/en/.

Kirk-Othmer, Encyclopedia of Chemical Technology 5th Ed (Wiley Interscience 2005), vol. 13, pp. 402-455 High-Pressure Chemistry.

Kirk-Othmer, Encyclopedia of Chemical Technology 5th Ed (Wiley Interscience 2005), vol. 18, pp. 30-54, Packaging, Food.

* cited by examiner

HIGH PRESSURE PROCESSING METHODS FOR READY-TO-DRINK BEVERAGES WITH SOLIDS

CROSS-REFERENCE TO RELATED APPLICATIONS

This application claims priority and benefit of U.S. Provisional Application Ser. No. 63/267,727, filed Feb. 9, 2022; and further claims benefit of Chinese Application Ser. No. CN 202210033495.2, filed Jan. 12, 2022, Ser. No. CN 202210032202.9, filed Jan. 12, 2022, Ser. No. CN 202210032215.6, filed Jan. 12, 2022, and Ser. No. CN 202210032213.7, filed Jan. 12, 2022.

STATEMENT REGARDING FEDERALLY SPONSORED RESEARCH OR DEVELOPMENT

Not Applicable

FIELD OF THE INVENTION

The present invention relates to the field of ready-to-drink (RTD) beverages. It also relates to RTD beverage products having solid(s) therein. The invention further relates to the field of beverage and food sterilization techniques. In particular embodiments, the invention relates to RTD beverages known as milk teas, boba teas, fruit teas, herbal teas, infused waters, infused alcoholic waters, cold brewed teas, and other ingestible liquids containing solids selected from boba (sometimes also known as bubbles, pearls, balls), fruit pieces, and/or other ingestible plant matter. Additionally, the present invention relates to the use of High-Pressure Processing (HPP), applied to the beverage with the solid pieces contained therein, in connection with the manufacture of the RTD beverages. The present invention further relates to manufacturing methods to make the aforementioned products.

BACKGROUND OF THE INVENTION

Typical ordinary commercial beverages that are currently on the market have a wide variety of sterilization techniques that can be applied to them so that the respective shelf lives are compatible with commercial distribution, sale, and usage. Such "typical ordinary beverages" do not contain solids in the beverages. Newer beverages, in particular tea beverages and fruit juices have solid pieces of food items in the beverage have come into popularity. In addition, cold brewed tea (tea brewed without the use of heat) has also been used in the past as when one places tea into a volume of water in a clear container and sets it out in the sun for the extraction of some of the tea components to make a beverage without significant heating (colloquially referred to as "Sun Tea"). More recently, it has also come into fashion to retain the tea leaves in the beverage through the time of consumption of the beverage (although the tea leaves are not consumed). (For ease of reference, the beverages having pieces of food items in them and/or intact tea leaves in the beverage (other than incidental tea leaf fines not removed during ordinary removal of brewed tea leaves) are hereinafter referred to as "New Style Beverages" or "New Style Teas" as appropriate.) Currently, such New Style Teas (a subset of New Style Beverages), are made to order in, and sold through, street-side tea shops.

Traditionally, "boba milk teas" (a subset of the New Style Beverages) have been made fresh in street-side tea shops, and need to be consumed within 1-2 days or they will go sour/rancid since adequate sterilization procedures in street-side tea shops are simply not possible. Fruit teas often contain slices or chunks of fruits (another subset of New Style Beverages when containing such solid pieces). Sales of such fruit teas in street-side tea shops also do not allow for adequate sterilization and thus also need to be consumed within 1-2 days or they turn sour/rancid. Cold brew teas, as used herein in connection with New Style Beverages, (hereinafter CBT) are tea beverages that still have tea leaves soaking in the tea liquid as the consumer is drinking it, although the tea leaves are not ingested. The ingredients are primarily water and tea leaves (although additional food solids or the above mentioned boba may also be included as desired). In each case, as desired, additional flavors, spices, and if desired dissolved or dispersed nutrients, may also be included.

Compared with hot-brewed (or cooked tea), cold brewed tea maximizes the retention of the freshness and flavor of the tea leaves, and reduces the amount of tannin and caffeine that is extracted in the brewing process while simultaneously releasing more of the sweet tasting amino acids that are extractible. This is especially so in the case of the normal cold-brew process as in the making of "Sun Tea" since the tea leaves are removed after a period of time, before all of the tannin and caffeine are extracted from the leaves. As a result cold brewed tea reduces the bitter taste of the tea, makes it sweeter and results in a tea lower in caffeine. Sales of such cold-brewed teas through street-side tea shops also do not allow for appropriate sterilization and need to be consumed in a reasonably short time period.

Traditional methods of sterilization beverages generally in commercial settings include the use of applied heat (including pasteurization, flash pasteurization, Ultra-High-Temperature (UHT), etc). These methods alter the color, taste, and nutritional value of the "milk tea". These methods also make the boba (when present) lose its chewy texture, the chewiness being one of the main reasons that bobas are so popular amongst consumers. With respect to fruit teas, these heat applying sterilization techniques alter the color, taste, and nutritional value of the fruit chunks and the liquid itself (which is composed of tea with or without the corresponding juice). These same heat applying sterilization techniques alter the color, taste, and nutritional value of the tea. The heat sterilization techniques also make the (generally green) tea leaves turn brown, which itself is undesirable. Thus, heat sterilization techniques are not appropriate for any of these New Style Beverage products.

Current production methods for placing solid food items into RTD beverages are not able to place the solids used in the New Style Beverages that are more than 5 mm into RTD bottles in a reliable and reproducible manner. In fact, current production methods even have difficulty in accommodating such solid matter that is greater than 3 mm depending upon shape and tackiness of the solid matter, in any reliable, consistent, and repeatable manner. (Typical boba diameters are more than 5 mm up to 15 mm in diameter, while typical fruit chunks/slices in fruit teas are in the range of 5 mm to 25 mm.) Current production methods are also not able to reliably, consistently, and repeatedly place very light items (individual tea leaves being less than 0.3 g—generally in the range of 0.05 g to 0.2 g in weight) into RTD bottles (i.e. inserting dry tea leaves into RTD bottles reliably and repeatedly in a consistent manner for brewing of individual serving size New Style Beverages can be quite problematic). Thus, to date commercial production lines for the New Style Beverages (whether boba teas, fruit teas, or cold-brewed teas) are simply not available. This means that consumers desirous of obtaining such New Style Beverages need to obtain them freshly made from the aforementioned specialty street-side tea shops, consume those beverages in a relatively short period, and then repeat this process frequently. Finally, due to the inability to have automation and large-scale production and resulting labor intensity in local shop prepared beverages, these New Style Beverages are expensive and have been known to range from US$4.00 to US$7.00 for a single 354 ml (12 fluid ounce) serving.

As stated above, the New Style beverages have very short shelf lives (1-2 days) and cannot be made in large scale factory settings and then sold through typical retail distribution channels (such as convenience stores, supermarkets, hypermarkets, specialty stores, warehouse clubs, etc.) or online retail channels, all of which require much longer shelf lives (e.g. at least 15 days or longer, ideally at least 30 days). Such a longer shelf life requires some form of preservation such as sterilization. Most consumers of the New Style Beverages prefer to not have artificial preservatives added to their beverages, and thus, such preservatives are not a viable means of extending the shelf life of the New Style Beverages. Most currently available methods of sterilization rely on heat—including pasteurization, flash pasteurization, ultra-high temperature processing (UHT), etc.—which unsuitably alters the color, taste/flavor, texture, and nutritional value of solids content (e.g., fruit chunks, boba, etc.) and the liquid itself (e.g., juice, tea, milk tea, etc.). It makes tea leaves turn brown, which is undesirable. It also results in the boba losing its chewy inside texture. Boba is one of the main attractions of boba milk tea. It is the chewy texture of the boba that is a major reason that boba teas are so popular amongst consumers. Therefore, heat-based preservation is not suitable to the New Style Beverages either.

The present inventor has found that in the New Style Beverages that contain boba, the boba are overwhelmingly tapioca based boba. These tapioca based boba and the so-called "popping boba" define the bulk of the market for the New Style Beverages. As stated above, these New Style Beverages are made to order in street side tea shops. However, these street side tea shop made to order products have short shelf life measured in 2-3 days, if that long. The present inventor sought to utilize non-heat sterilization methods in an effort to be able to have a longer shelf-life boba containing product, but found the non-heat sterilization methods unacceptable with boba. HPP was attempted with the prevailing boba type New Style Beverages (tapioca based boba or popping boba) and it was found that the boba used there (a) did not survive the HPP processing step, (b) lost flavor and/or gained a hard texture generally tasted terrible after HPP processing which is a major disadvantage from the consumers perspective, (c) lost its pre-HPP processing pleasant appearance (loss of a main attraction point for the ultimate consumer), and (d) lost its pleasant mouth-feel once drawn into the mouth in the course of ingesting the product. The foregoing effects a) through d) occur during the HPP process during manufacture and/or the periods when the boba is soaking in the relevant liquid of the beverage during the storage period between manufacture and consumption. However, after much effort and failures, the present inventor discovered that using "crystal boba" (boba based on konjac and/or based on agar), when exposed to HPP and soaking in the liquid beverage for more than 180 days, not only obtained a commercially suitable shelf-life for the RTD product, but further did so while still retaining the boba integrity, its shape, its appealing taste, and its appealing chewy texture on ingestion. This was in fact quite surprising in light of the experience encountered with tapioca based boba and the popping boba, and was not known by others who are operating in this industry today.

OBJECTS OF THE INVENTION

It is therefore an object of an embodiment of the invention to provide an RTD beverage that contains at least one solid selected from the group consisting of boba, solid pieces of fruit, tea leaves, and mixtures thereof with a shelf-life of at least 30 days.

It is another object of an embodiment of the invention to provide an RTD beverage that contains at least one solid selected from the group consisting of boba, solid pieces of fruit, tea leaves, and mixtures thereof with a shelf-life of at least 60 days.

It is another object of an embodiment of the invention to provide an RTD beverage that contains at least one solid selected from the group consisting of boba, solid pieces of fruit, tea leaves, and mixtures thereof with a shelf-life of at least 90 days.

It is another object of an embodiment of the invention to provide an RTD beverage that contains at least one solid selected from the group consisting of boba, solid pieces of fruit, tea leaves, and mixtures thereof with a shelf-life of at least 120 days.

It is another object of an embodiment of the invention to provide an RTD beverage that contains at least one solid selected from the group consisting of boba, solid pieces of fruit, tea leaves, and mixtures thereof with a shelf-life of at least 150 days.

It is another object of an embodiment of the invention to provide an RTD beverage that contains at least one solid selected from the group consisting of boba, solid pieces of fruit, tea leaves, and mixtures thereof with a shelf-life of at least 180 days.

It is another object of an embodiment of the invention to provide a method for the production of an RTD beverage that contains at least one solid selected from the group consisting of boba, solid pieces of fruit, tea leaves, and mixtures thereof with a shelf-life of at least 30 days.

It is another object of an embodiment of the invention to provide a method for the production of an RTD beverage that contains at least one solid selected from the group consisting of boba, solid pieces of fruit, tea leaves, and mixtures thereof with a shelf-life of at least 60 days.

It is another object of an embodiment of the invention to provide a method for the production of an RTD beverage that contains at least one solid selected from the group consisting of boba, solid pieces of fruit, tea leaves, and mixtures thereof with a shelf-life of at least 90 days.

It is another object of an embodiment of the invention to provide a method for the production of an RTD beverage that contains at least one solid selected from the group consisting of boba, solid pieces of fruit, tea leaves, and mixtures thereof with a shelf-life of at least 120 days.

It is another object of an embodiment of the invention to provide a method for the production of an RID beverage that contains at least one solid selected from the group consisting of boba, solid pieces of fruit, tea leaves, and mixtures thereof with a shelf-life of at least 150 days.

It is another object of an embodiment of the invention to provide a method for the production of an RTD beverage that contains at least one solid selected from the group consisting of boba, solid pieces of fruit, tea leaves, and mixtures thereof with a shelf-life of at least 180 days.

It is another object of an embodiment of the invention to provide an RTD beverage that contains at least one solid selected from the group consisting of boba, solid pieces of fruit, tea leaves, and mixtures thereof with a shelf-life of at least 30 days without the use of heat sterilization techniques.

It is another object of an embodiment of the invention to provide an RTD beverage that contains at least one solid selected from the group consisting of boba, solid pieces of fruit, tea leaves, and mixtures thereof with a shelf-life of at least 60 days without the use of heat sterilization techniques.

It is another object of an embodiment of the invention to provide an RTD beverage that contains at least one solid selected from the group consisting of boba, solid pieces of fruit, tea leaves, and mixtures thereof with a shelf-life of at least 90 days without the use of heat sterilization techniques.

It is another object of an embodiment of the invention to provide an RTD beverage that contains at least one solid selected from the group consisting of boba, solid pieces of fruit, tea leaves, and mixtures thereof with a shelf-life of at least 120 days without the use of heat sterilization techniques.

It is another object of an embodiment of the invention to provide an RTD beverage that contains at least one solid selected from the group consisting of boba, solid pieces of fruit, tea leaves, and mixtures thereof with a shelf-life of at least 150 days without the use of heat sterilization techniques.

It is another object of an embodiment of the invention to provide an RTD beverage that contains at least one solid selected from the group consisting of boba, solid pieces of fruit, tea leaves, and mixtures thereof with a shelf-life of at least 180 days without the use of heat sterilization techniques.

It is another object of an embodiment of the invention to provide a method for the production of an RTD beverage that contains at least one solid selected from the group consisting of boba, solid pieces of fruit, tea leaves, and mixtures thereof with a shelf-life of at least 30 days without the use of heat sterilization techniques.

It is another object of an embodiment of the invention to provide a method for the production of an RTD beverage that contains at least one solid selected from the group consisting of boba, solid pieces of fruit, tea leaves, and mixtures thereof with a shelf-life of at least 60 days without the use of heat sterilization techniques.

It is another object of an embodiment of the invention to provide a method for the production of an RTD beverage that contains at least one solid selected from the group consisting of boba, solid pieces of fruit, tea leaves, and mixtures thereof with a shelf-life of at least 90 days without the use of heat sterilization techniques.

It is another object of an embodiment of the invention to provide a method for the production of an RTD beverage that contains at least one solid selected from the group consisting of boba, solid pieces of fruit, tea leaves, and mixtures thereof with a shelf-life of at least 120 days without the use of heat sterilization techniques.

It is another object of an embodiment of the invention to provide a method for the production of an RTD beverage that contains at least one solid selected from the group consisting of boba, solid pieces of fruit, tea leaves, and mixtures thereof with a shelf-life of at least 150 days without the use of heat sterilization techniques.

It is another object of an embodiment of the invention to provide a method for the production of an RTD beverage that contains at least one solid selected from the group consisting of boba, solid pieces of fruit, tea leaves, and mixtures thereof with a shelf-life of at least 180 days without the use of heat sterilization techniques.

It is yet another object of an embodiment of the invention to provide an RTD beverage that contains at least one solid selected from the group consisting of boba, solid pieces of fruit, tea leaves, and mixtures thereof with a shelf-life of sufficient duration to allow the product to be mass produced and sold through commercial distribution chains.

Another object of an embodiment of the invention is to provide a boba containing RID beverage having a shelf-life of at least 30 days in which the chewy texture of the boba is retained.

Another object of an embodiment of the invention is to provide a boba containing RTD beverage having a shelf-life of at least 60 days in which the chewy texture of the boba is retained.

Another object of an embodiment of the invention is to provide a boba containing RTD beverage having a shelf-life of at least 90 days in which the chewy texture of the boba is retained.

Another object of an embodiment of the invention is to provide a boba containing RTD beverage having a shelf-life of at least 120 days in which the chewy texture of the boba is retained.

Another object of an embodiment of the invention is to provide a boba containing RTD beverage having a shelf-life of at least 150 days in which the chewy texture of the boba is retained.

Another object of an embodiment of the invention is to provide a boba containing RTD beverage having a shelf-life of at least 180 days in which the chewy texture of the boba is retained.

Still another object of an embodiment of the invention is to provide an RTD fruit beverage containing solid pieces of fruit having a shelf-life of at least 30 days, wherein the shape and taste of such fruit pieces is maintained.

Still another object of an embodiment of the invention is to provide an RTD fruit beverage containing solid pieces of fruit having a shelf-life of at least 60 days, wherein the shape and taste of such fruit pieces is maintained.

Still another object of an embodiment of the invention is to provide an RTD fruit beverage containing solid pieces of fruit having a shelf-life of at least 90 days, wherein the shape and taste of such fruit pieces is maintained.

Still another object of an embodiment of the invention is to provide an RTD fruit beverage containing solid pieces of fruit having a shelf-life of at least 120 days, wherein the shape and taste of such fruit pieces is maintained.

Still another object of an embodiment of the invention is to provide an RTD fruit beverage containing solid pieces of fruit having a shelf-life of at least 150 days, wherein the shape and taste of such fruit pieces is maintained.

Still another object of an embodiment of the invention is to provide an RTD fruit beverage containing solid pieces of fruit having a shelf-life of at least 180 days, wherein the shape and taste of such fruit pieces is maintained.

Yet another object of an embodiment of the invention is to provide an RID beverage product which is a cold brewed tea having a shelf-life of at least 30 days, wherein the freshness and flavor of the tea leaves are retained, notwithstanding the tea leaves being retained in the RTD beverage through consumption of the RTD beverage.

Yet another object of an embodiment of the invention is to provide an RTD beverage product which is a cold brewed tea having a shelf-life of at least 60 days, wherein the freshness and flavor of the tea leaves are retained, notwithstanding the tea leaves being retained in the RTD beverage through consumption of the RTD beverage.

Yet another object of an embodiment of the invention is to provide an RTD beverage product which is a cold brewed tea having a shelf-life of at least 90 days, wherein the freshness and flavor of the tea leaves are retained, notwithstanding the tea leaves being retained in the RTD beverage through consumption of the RTD beverage.

Yet another object of an embodiment of the invention is to provide an RTD beverage product which is a cold brewed tea having a shelf-life of at least 120 days, wherein the freshness and flavor of the tea leaves are retained, notwithstanding the tea leaves being retained.

Yet another object of an embodiment of the invention is to provide an RTD beverage product which is a cold brewed tea having a shelf-life of at least 150 days, wherein the freshness and flavor of the tea leaves are retained, notwithstanding the tea leaves being retained in the RTD beverage through consumption of the RTD beverage.

Yet another object of an embodiment of the invention is to provide an RTD beverage product which is a cold brewed tea having a shelf-life of at least 180 days, wherein the freshness and flavor of the tea leaves are retained, notwithstanding the tea leaves being retained in the RTD beverage through consumption of the RTD beverage.

Another object of an embodiment of the invention is to provide a process for the manufacture of a boba containing RTD beverage having a shelf-life of at least 30 days in which the chewy texture of the boba is retained.

Another object of an embodiment of the invention is to provide a process for the manufacture of a boba containing RTD beverage having a shelf-life of at least 60 days in which the chewy texture of the boba is retained.

Another object of an embodiment of the invention is to provide a process for the manufacture of a boba containing RTD beverage having a shelf-life of at least 90 days in which the chewy texture of the boba is retained.

Another object of an embodiment of the invention is to provide a process for the manufacture of a boba containing RTD beverage having a shelf-life of at least 120 days in which the chewy texture of the boba is retained.

Another object of an embodiment of the invention is to provide a process for the manufacture of a boba containing RTD beverage having a shelf-life of at least 150 days in which the chewy texture of the boba is retained.

Another object of an embodiment of the invention is to provide a process for the manufacture of a boba containing RTD beverage having a shelf-life of at least 180 days in which the chewy texture of the boba is retained.

Still another object of an embodiment of the invention is to provide a process for the manufacture of an RTD fruit beverage containing solid pieces of fruit having a shelf-life of at least 30 days, wherein the shape and taste of such fruit pieces is maintained.

Still another object of an embodiment of the invention is to provide a process for the manufacture of an RTD fruit beverage containing solid pieces of fruit having a shelf-life of at least 60 days, wherein the shape and taste of such fruit pieces is maintained.

Still another object of an embodiment of the invention is to provide a process for the manufacture of an RTD fruit beverage containing solid pieces of fruit having a shelf-life of at least 90 days, wherein the shape and taste of such fruit pieces is maintained.

Still another object of an embodiment of the invention is to provide a process for the manufacture of an RTD fruit beverage containing solid pieces of fruit having a shelf-life of at least 120 days, wherein the shape and taste of such fruit pieces is maintained.

Still another object of an embodiment of the invention is to provide a process for the manufacture of an RTD fruit beverage containing solid pieces of fruit having a shelf-life of at least 150 days, wherein the shape and taste of such fruit pieces is maintained.

Still another object of an embodiment of the invention is to provide a process for the manufacture of an RTD fruit beverage containing solid pieces of fruit having a shelf-life of at least 180 days, wherein the shape and taste of such fruit pieces is maintained.

Yet another object of an embodiment of the invention is to provide a process for the manufacture of an RTD beverage product which is a cold brewed tea having a shelf-life of at least 30 days, wherein the freshness and flavor of the tea leaves is retained, notwithstanding the tea leaves being retained in the RTD beverage during consumption of the RTD beverage.

Yet another object of an embodiment of the invention is to provide a process for the manufacture of an RTD beverage product which is a cold brewed tea having a shelf-life of at least 60 days, wherein the freshness and flavor of the tea leaves is retained, notwithstanding the tea leaves being retained in the RTD beverage during consumption of the RTD beverage.

Yet another object of an embodiment of the invention is to provide a process for the manufacture of an RTD beverage product which is a cold brewed tea having a shelf-life of at least 90 days, wherein the freshness and flavor of the tea leaves is retained, notwithstanding the tea leaves being retained in the RTD beverage during consumption of the RTD beverage.

Yet another object of an embodiment of the invention is to provide a process for the manufacture of an RTD beverage product which is a cold brewed tea having a shelf-life of at least 120 days, wherein the freshness and flavor of the tea leaves is retained, notwithstanding the tea leaves being retained in the RTD beverage during consumption of the RTD beverage.

Yet another object of an embodiment of the invention is to provide a process for the manufacture of an RTD beverage product which is a cold brewed tea having a shelf-life of at least 150 days, wherein the freshness and flavor of the tea leaves is retained, notwithstanding the tea leaves being retained in the RTD beverage during consumption of the RTD beverage.

Yet another object of an embodiment of the invention is to provide a process for the manufacture of an RTD beverage product which is a cold brewed tea having a shelf-life of at least 180 days, wherein the freshness and flavor of the tea leaves is retained, notwithstanding the tea leaves being retained in the RTD beverage during consumption of the RTD beverage.

An even further object of an embodiment of the invention is to provide an RTD beverage of any of the foregoing objects that further contains an alcoholic component (a HARD RTD beverage).

A still further object of an embodiment of the invention is to provide a method of manufacture of any of the forgoing methods of manufacture that further contains an alcoholic component.

Yet an additional object of an embodiment of the invention is to provide a HARD RTD beverage containing solid pieces as well as an alcoholic component prepared by the methods set forth herein.

An even further object of an embodiment of the invention is to provide an RTD of any of the foregoing objects containing one or more additional components selected from additional ingestible flavors, spices, aromatics, sweeteners, and colorants.

An even further object of an embodiment of the invention is to provide a process for the manufacture of an RTD of any of the foregoing objects containing one or more additional components selected from additional ingestible flavors, spices, aromatics, sweeteners, and colorants.

An even further object of an embodiment of the invention is to provide an RTD beverage product prepared by a process for the manufacture of an RTD of any of the foregoing objects containing one or more additional components selected from additional ingestible flavors, spices, aromatics, sweeteners, and colorants.

Still further object of the various embodiments of the invention will be recognized by those of ordinary skill in the art after being acquainted with the present invention disclosure and claims.

BRIEF SUMMARY OF THE INVENTION

These and other objects of the invention are surprisingly achieved by a process in which solid pieces of ingestible fruit chunks and/or crystal bobas and/or tea leaves are placed into a container along with an ingestible beverage base, the container is sealed and subjected to High Pressure Processing (HPP). The ingestible liquid base (the liquid portion or the liquid portion with dissolved or suspended components therein) of the beverage is generally prepared in advance or where the liquid portion has multiple components, such multiple components may be combined before introduction into the container or may be introduced into the container in separate steps. The container is selected from those that can withstand and transmit extreme compressive force (at least in the range of 200 MPa up to 700 MPa, with particular containers matched to the desired pressure to be used in the particular HPP step) to its contents while remaining intact, including its seal, and is capable of regaining its shape after the extreme compressive force is released. This process avoids the use of heat sterilization methods, but still provides extensive increases in shelf-life. In addition, the RTD beverage may further include an alcoholic component resulting in the end product being a HARD RTD. To more easily distinguish non-alcoholic RTDs of the invention from alcoholic RTDs of the invention, the non-alcoholic RTDs will be referred to as SOFT RTDs. (RTDs, without reference to either SOFT or HARD, will mean both, collectively.) Furthermore, the RTDs of the invention, whether SOFT RTDs or HARD RTDs may have further components included which further components are selected from the group consisting of one or more of additional flavors, spices, aromatics, sweeteners, and colorants. The process of the various embodiments of the invention allows for the RTDs of the invention to have extended shelf lives of 30 days or more (as discussed more fully elsewhere below) and allows for such products to retain the taste, color, texture, and nutritional value of the beverage and its solids components over time, and simultaneously allows for the avoidance and exclusion of artificial preservatives from the RTDs. In addition, the process also retains the chewy texture of crystal bobas which may be present in certain embodiments.

DETAILED DESCRIPTION OF THE INVENTION

Figure 1:
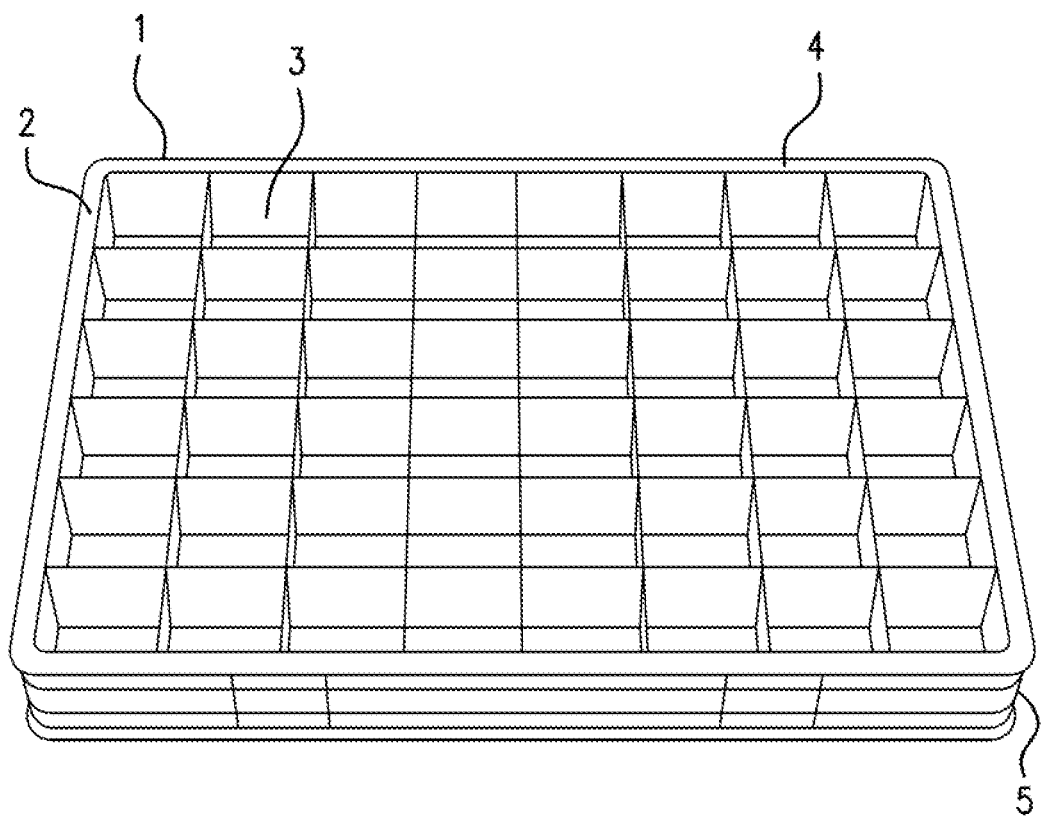
FIG. 1 is a perspective view of a matrix box for use in one manner of a filling step of an RTD beverage preparation method according to an embodiment of the invention.

The various embodiments of the present invention are directed to Ready-To-Drink (RTD) beverages and methods of preparation thereof, where the beverages contain solid pieces of at least one of (a) crystal boba, (b) fruit chunks/slices, or (c) tea leaves or other plant matter (such other plant matter being that which is typically brewed as a "tea"). These solid pieces and a liquid ingestible phase are introduced (in any desirable order) into a container, sealing the container, and subjecting the sealed container to a High-Pressure Processing (HPP) sterilization technique. The result of the HPP treatment is an RTD beverage product that has excellent storage shelf-life, and the treatment retains the shape, taste, and nutritional value of the aforementioned solid pieces contained in the product.

For purposes of this Specification and Claims, there are a number of related terms involving "shelf-life" that require particular definition. These are: (a) the "Label Expiration Date" (indicated by language on the product label or packaging that recites "Expires . . . ", "Use By . . . ", "Best By . . . ", or other similar language) and indicates the manufacturers or distributors etc. intended approximate last date by which the product will be consumed; and (b) "Actual Expiration Date" which is the last date which product, when properly made and stored and tested has a Colony Forming Unit/ml (CFU/ml) (as discussed herein) of less than $1 \times 10^6$ (using 6 significant figures—i.e., $0.999994 \times 10^6$ being less than $1.0 \times 10^6$, but 0.999995 being considered $1.0 \times 10^6$ insofar as currently available testing equipment cannot adequately distinguish between differences of 10/CFU/ml or less) CFU count in CFU/ml of less than $1 \times 10^6$ CFU/ml is determined for purposes of this invention by (a) opening a bottle that was on storage at 1° C. to 7° C. from manufacture until the designated test date, (b) removing a 1 ml aliquot therefrom and diluting that aliquot with 9 ml of water containing standard microbial nutrients (generally 95% water and up to 5% nutrients); and (c) then placing an aliquot of the so diluted sample onto plate count agar (PCA). The plates with the samples thereon are closed and stored at 30° C. for 48 hours and the number of colonies formed are determined and expressed as CFU/ml. A CFU/ml of $1 \times 10^6$ CFU/ml (log 6) or more is considered a "fail" and the longest known shelf life for that product is technically the time point between the "fail" test and the last "pass" test for a sample from that batch of product. If the time period from manufacture to "fail" test date and "pass" test date differences (pass on "date a" but fail on "date b") would be crucial to meeting the limitations of a particular claim hereof, a more precise pass/fail determination can be made with another batch of the same product which has not yet reached the same time points in contention and now tested more frequently between the last "pass" determination of the former batch testing until a "fail" is again encountered. (By way of example and not as a limitation, if one batch of product a shows a "pass" at 150 days post manufacture, but a "fail" at 180 days post manufacture, and a more specific time point of crossing the pass/fail boundary is desired, a second batch of product, which has not yet had a "fail" prior to 151 days post manufacture, can be scheduled for retesting at shorter periods such as weekly, semi-weekly, every other day, or even daily, if desired in order to obtain a more precise date of transition between the longest period in which a "pass" result is obtained and a first time period at which a "fail" result is obtained. Since the Label Expiration Date may be of lesser duration than the "Actual Expiration Date" of the product, but actual consumption may be either before or after such Label Expiration Date, it is preferable that RTDs meet the requirements for one of the Actual Expiration Date. In practice, in order for there to be confidence that virtually all product will be consumed before the "Actual Expiration Date", Label Expiration Dates are generally set at such earlier dates as my be arbitrarily set by the manufacturer/distributer. Thus, while the Label Expiration Date is not a fixed date until the manufacturer labels the product, if the product is properly made and stored (as set forth herein) and meets the requirements set forth herein at least through the date it is labelled to expire, and that date is at least as long as an expiration time period (measured from the date of manufacture), then that RTD product is deemed within the scope of such claim A product having an actual expiration date longer than the expiration time period mentioned in this document is without further proof deemed to meet the "Actual Expiration Time Period" that is of lesser duration from the date of manufacture. (For clarity, a product demonstrating a "pass" CFU/ml result on day 210 post manufacture is deemed to have had a "pass result at all prior time points, even if the 210 day post manufacture test was the only testing conducted. However, a "fail" CFU/ml test result at day 210 post manufacture will not impact or inform about an earlier test status. Also, a "fail" CFU/ml at an shorter time period from manufacture will be construed as a "fail" for that batch of product for all time points thereafter. As different batches of product may yield differing results, it is recognized that for purposes of determining whether a particular product is or is not within the scope of the claim, individual batch-by-batch determination may be needed until such time as enough evidence is obtained to statistically show that if a product was properly made and then properly stored under the conditions set forth above and properly tested as set forth above, that such product would also result in the same CFU/ml levels as a claim relevant time point post manufacture.

The base liquid phase used to create the various embodiment of the products of the present invention can be selected from virtually any ingestible fluid and include various teas (inclusive of herbal teas), coffees, fruit juices, vegetable juices, animal milks, nut (and other plant) milks, and flavored and unflavored waters. Each of the forgoing may be plain (i.e., neat) or flavored with further flavorings as are typically used in connection with the same. When teas or herbal teas are the "base liquid phase" they are brewed previously in any known brewing method and the organic matter that is brewed in that prior process is separated from the liquid phase and the liquid phase is then used. Such teas can be made from a member of the group including, but not limited to black tea, red tea, green tea, white tea, jasmine tea, oolong tea, matcha tea, honey tea, pu'er tea, rooibos tea, thai tea, chai tea, ginger tea, yuzu tea, honey water/honey tea, winter melon tea, chrysanthemum tea, rose tea, peach tea, bergamot tea (i.e., Earl Grey), and other floral or flavored teas as are commonly available for brewing. Blends of different kinds of teas are suitable as well. A wide variety of such teas, both standard black, green, white, and red tea as well as their decaffeinated counterparts, and their flavored counterparts and blended teas are available from a wide variety of sources known in the art, from, including, but not limited to, Twining, Bigelow, Stash, Tazo, Choice, Numi, Yogi, Harney and Sons, Celestial Seasonings, Lipton, Yorkshire, Dilmah, Teavana, Teatley, Bigelow, Yogi, Argo, and a multitude of others. A frequent variant of the above are flavored teas which may be prepared by adding non-tea brewable plant parts for ingestion such as floral petals of various kinds including, but not limited to, mint leaves, spearmint leaves, lotus blossums, rose petals, orange blossums, etc. Other flavored teas include various plant oils, the most widely known being bergamot oil in Earl Grey tea. Still others are herbal teas, including, without limitation, mint tea, spearmint tea, rooibos tea, ginger tea, chamomile tea, etc. Still others include flavorings imparted by the fleshy parts of various plant materials, such as various fruits and melons. All of these are prepared into a "tea" liquid when being used as the base liquid phase. Other base liquid phase materials may be selected from popular flavors of cakes, cookies, confectioneries, candies, pastries, custards, puddings, and tarts, as well as various types of coffee, such as black coffee, espresso coffee, latte coffee, American coffee, their decaffeinated counterparts, and flavored counterparts, among still others commonly known in the art. Each of these coffees may be single source or blended. Typical single source coffees are Mexican, Costa Rican, Nicaraguan, Honduran, Guatamalan, Brazilian, Columbian, Venezuelan, Nigerian, Sudanese, Indonesian, Sumatran, etc. Yet further possible base liquid phases for use in the present invention embodiments include fruit juices and edible plant saps. The fruit juices and edible plant saps for use as base liquid phases in certain embodiments of the present invention include, without limitation, mango juice, strawberry juice, orange juice, grapefruit juice, lemon juice, taro juice, ube juice, avocado juice, kumquat juice, blueberry juice, sugar cane juice (aka sugar cane sap), maple sap, birch sap, maple water, birch water, agave sap, cherry juice, cranberry juice, etc. Yet further base liquid phases for use in certain embodiments of the present invention include various dairy and non-dairy milks. These dairy milks include farm animal milks such as cows milk, goats milk, sheeps milk, etc, each of which may be a full fat milk, a low-fat milk, or a non-fat milk as desired, and each may be enriched with vitamins and/or particular other fats not normally present in such milks or at higher concentrations than would be otherwise than by such enrichment. The non-dairy milks include tree-nut milks such as, without limitation, sweet almond (as contrasted with bitter almond and not an indication of sugar content) milk (also simply known as "almond milk"), walnut milk, etc., and other plant-based milks such as, without limitation, oat milk, soy milk, rice milk, peanut milk, sesame milk, corn milk, coconut milk, and coconut water. If the beverage is to be a tea that is cold brewed effectively while the product is exposed to the HPP technique (that is the extraction of tea components is effected by the HPP process itself), then the base fluid component may also be simply plain water. Similarly, where the product is to be a flavored water that does not require preparation into a fully or partially flavored water before being added to the final container, again the base fluid component may be plain water. The plain water here may be selected from any potable water source including well water, tap water, or may be a purified water such as demineralized water, reverse osmosis water, or distilled water as desired. Tap water is a most desirable water source as it is low cost.

If desired, alcoholic beverages can also be utilized as the base liquid phase, or may be added to the other base liquid phase components discussed above. When alcoholic components are used, they are generally added to the other base liquid phase components and generally not used as the only base liquid phase components, but this is merely a matter of choice and there is no reason to exclude an alcoholic component being the sole base liquid phase component. Alcoholic components which may be added to the other base liquid phase or which, if desired, may be used as the sole base liquid phase component include, but are not limited to, vodka, rum, gin, whiskey, brandy, tequila, absinthe, mezcal, sake, and a multitude of wines known all over the world. Also suitable are the wide range of alcoholic cordials, just a sampling of which include, without limitation, Amoretto (almond flavor), Midori (honeydew flavor), Calvedos (apple flavor), Tia Maria (orange coffee flavor), Kahlua (coffee flavored), Chambourd (raspberry/honey flavor), among many others that are well known.

In addition, the base liquid phase may further have various flavorings and spices added to it, or such added spices and flavorings may be combined with the matter being "brewed" before it is brewed, with the end result that the product contains the additional flavorings and/or spices. Alternatively, the flavorings or spices may be added after any brewing has been carried out. The important point is that any such flavorings and spices that are desired must be added at some point prior to the sealing of the container.

The various components of the base liquid phase may be pre-blended and then added to the container or added to the container in any order of addition as may be convenient. Typically, they are pre-blended and can be added to the container before or after the solid pieces are added, but typically are added to the container after the solid pieces have been added. When more than one of the foregoing liquids is used, they can be blended in any combination and in any relative proportions that may be desired and used as a blend for the total amount of liquid component hereinbefore mentioned. Alternatively, such blends may be made in situ by serial addition of one or more of the referenced liquids. Each may be used independently in amounts ranging from zero to 100% of the liquid component provided the sum of all of the liquids mentioned in any particular beverage does not exceed 100% of the liquid component total. Exemplary, non-limiting combinations are set for the in the table below:

| | Liquid components in % of total liquid component | | | | | |
|---|---|---|---|---|---|---|
| | Water or flavored water* | Tea or herbal tea or tea/herbal tea blend | Fuit juice or fruit juice/ vegetable juice blend | Animal milk or plant milk or liquid creamers or plant sap or blends thereof | Brewed liquid coffees | Alcohol containing liquids |
| A | 100 | — | — | — | — | — |
| B | — | 100 | — | — | — | — |
| C | — | — | 100 | — | — | — |
| D | — | — | — | 100 | — | — |
| E | — | — | — | — | 100 | — |
| F | — | — | — | — | — | 100 |
| G | — | 75 | 25 | — | — | — |
| H | — | 75 | — | 25 | — | — |
| I | — | 75 | — | — | 25 | — |
| J | — | 75 | — | — | — | 25 |
| K | — | 50 | 50 | — | — | — |
| L | — | 50 | — | 50 | — | — |
| M | — | 50 | — | — | 50 | — |
| N | — | 50 | — | — | — | 50 |
| O | — | 25 | 75 | — | — | — |
| P | — | 25 | — | 75 | — | — |
| Q | — | 25 | — | — | 75 | — |
| R | — | 25 | — | — | — | 75 |
| S | — | — | 75 | 25 | — | — |
| T | — | — | 75 | — | 25 | — |
| U | — | — | 75 | — | — | 25 |
| V | — | — | 50 | 50 | — | — |
| W | — | — | 50 | — | 50 | — |
| X | — | — | 50 | — | — | 50 |
| Y | — | — | 25 | 75 | — | — |
| Z | — | — | 25 | — | 75 | — |
| AA | — | — | 25 | — | — | 75 |
| AB | — | — | — | 75 | 25 | — |
| AC | — | — | — | 75 | — | 25 |
| AD | — | — | — | 50 | 50 | — |
| AE | — | — | — | 50 | — | 50 |
| AF | — | — | — | 25 | 75 | — |
| AG | — | — | — | 25 | — | 75 |
| AH | — | — | — | — | 75 | 25 |
| AI | — | — | — | — | 50 | 50 |
| AJ | — | — | — | — | 25 | 75 |
| AK | — | 70 | 20 | 10 | — | — |
| AL | — | 70 | 10 | 20 | — | — |
| AM | — | 50 | 25 | 25 | — | — |
| AN | — | 25 | 25 | 50 | — | — |
| AO | — | 25 | 50 | 25 | — | — |
| AP | — | 20 | 70 | 10 | — | — |
| AQ | — | 20 | 10 | 70 | — | — |

-continued

| | Liquid components in % of total liquid component ||||||
| --- | --- | --- | --- | --- | --- | --- |
| | Water or flavored water* | Tea or herbal tea or tea/herbal tea blend | Fuit juice or fruit juice/ vegetable juice blend | Animal milk or plant milk or liquid creamers or plant sap or blends thereof | Brewed liquid coffees | Alcohol containing liquids |
| AR | — | 10 | 70 | 20 | — | — |
| AS | — | 10 | 20 | 70 | — | — |
| AT | — | 70 | 20 | — | 10 | — |
| AU | — | 70 | 10 | — | 20 | — |
| AV | — | 50 | 25 | — | 25 | |
| AW | — | 25 | 25 | — | 50 | |
| AX | — | 25 | 50 | — | 25 | |
| AY | — | 20 | 70 | — | 10 | |
| AZ | — | 20 | 10 | — | 70 | |
| BA | — | 10 | 70 | — | 20 | |
| BB | — | 10 | 20 | — | 70 | |
| BC | — | 70 | 20 | — | — | 10 |
| BD | — | 70 | 10 | — | — | 20 |
| BE | — | 50 | 25 | — | — | 25 |
| BF | — | 25 | 25 | — | — | 50 |
| BG | — | 25 | 50 | — | — | 25 |
| BH | — | 20 | 70 | — | — | 10 |
| BI | — | 20 | 10 | — | — | 70 |
| BJ | — | 10 | 70 | — | — | 20 |
| BK | — | 10 | 20 | — | — | 70 |
| BL | — | — | 70 | 20 | 10 | — |
| BM | — | — | 70 | 10 | 20 | — |
| BN | — | — | 50 | 25 | 25 | — |
| BO | — | — | 25 | 25 | 50 | — |
| BP | — | — | 25 | 50 | 25 | — |
| BQ | — | — | 20 | 70 | 10 | — |
| BR | — | — | 20 | 10 | 70 | — |
| BS | — | — | 10 | 70 | 20 | — |
| BT | — | — | 10 | 20 | 70 | — |
| BU | — | — | 70 | 20 | — | 10 |
| BV | — | — | 70 | 10 | — | 20 |
| BW | — | — | 50 | 25 | — | 25 |
| BX | — | — | 25 | 25 | — | 50 |
| BY | — | — | 25 | 50 | — | 25 |
| BZ | — | — | 20 | 70 | — | 10 |
| CA | — | — | 20 | 10 | — | 70 |
| CB | — | — | 10 | 70 | — | 20 |
| CC | — | — | 10 | 20 | — | 70 |
| CD | — | — | — | 70 | 20 | 10 |
| CE | — | — | — | 70 | 10 | 20 |
| CF | — | — | — | 50 | 25 | 25 |
| CG | — | — | — | 25 | 25 | 50 |
| CH | — | — | — | 25 | 50 | 25 |
| CI | — | — | — | 20 | 70 | 10 |
| CJ | — | — | — | 20 | 10 | 70 |
| CK | — | — | — | 10 | 70 | 20 |
| CL | — | — | — | 10 | 20 | 70 |
| CM | — | 40 | 30 | 20 | 10 | — |
| CN | — | 40 | 30 | 10 | 20 | — |
| CO | — | 40 | 20 | 30 | 10 | — |
| CP | — | 40 | 20 | 10 | 30 | — |
| CQ | — | 40 | 10 | 30 | 20 | — |
| CR | — | 40 | 10 | 20 | 30 | — |
| CS | — | 30 | 40 | 20 | 10 | — |
| CT | — | 30 | 40 | 10 | 20 | — |
| CU | — | 30 | 20 | 40 | 10 | — |
| CV | — | 30 | 20 | 10 | 40 | — |
| CW | — | 30 | 10 | 40 | 20 | — |
| CX | — | 30 | 10 | 20 | 40 | — |
| CY | — | 20 | 40 | 30 | 10 | — |
| CZ | — | 20 | 40 | 10 | 30 | — |
| DA | — | 20 | 30 | 40 | 10 | — |
| DB | — | 20 | 30 | 10 | 40 | — |
| DC | — | 20 | 10 | 40 | 30 | — |
| DD | — | 20 | 10 | 30 | 40 | — |
| DE | — | 10 | 40 | 30 | 20 | — |
| DF | — | 10 | 40 | 20 | 30 | — |
| DG | — | 10 | 30 | 40 | 20 | — |
| DH | — | 10 | 30 | 20 | 40 | — |
| DI | — | 10 | 20 | 40 | 30 | — |
| DJ | — | 10 | 20 | 30 | 40 | — |

-continued

| | Liquid components in % of total liquid component | | | | |
|---|---|---|---|---|---|
| | Water or flavored water* | Tea or herbal tea or tea/herbal tea blend | Fuit juice or fruit juice/ vegetable juice blend | Animal milk or plant milk or liquid creamers or plant sap or blends thereof | Brewed liquid coffees | Alcohol containing liquids |
| DK | — | 40 | 30 | 20 | — | 10 |
| DL | — | 40 | 30 | 10 | — | 20 |
| DM | — | 40 | 20 | 30 | — | 10 |
| DN | — | 40 | 20 | 10 | — | 30 |
| DO | — | 40 | 10 | 30 | — | 20 |
| DP | — | 40 | 10 | 20 | — | 30 |
| DQ | — | 30 | 40 | 20 | — | 10 |
| DR | — | 30 | 40 | 10 | — | 20 |
| DS | — | 30 | 20 | 40 | — | 10 |
| DT | — | 30 | 20 | 10 | — | 40 |
| DU | — | 30 | 10 | 40 | — | 20 |
| DV | — | 30 | 10 | 20 | — | 40 |
| DW | — | 20 | 40 | 30 | — | 10 |
| DX | — | 20 | 40 | 10 | — | 30 |
| DY | — | 20 | 30 | 40 | — | 10 |
| DZ | — | 20 | 30 | 10 | — | 40 |
| EA | — | 20 | 10 | 40 | — | 30 |
| EB | — | 20 | 10 | 30 | — | 40 |
| EC | — | 10 | 40 | 30 | — | 20 |
| ED | — | 10 | 40 | 20 | — | 30 |
| EE | — | 10 | 30 | 40 | — | 20 |
| EF | — | 10 | 30 | 20 | — | 40 |
| EG | — | 10 | 20 | 40 | — | 30 |
| EH | — | 10 | 20 | 30 | — | 40 |
| EI | — | 40 | 30 | — | 20 | 10 |
| EJ | — | 40 | 30 | — | 10 | 20 |
| EK | — | 40 | 20 | — | 30 | 10 |
| EL | — | 40 | 20 | — | 10 | 30 |
| EM | — | 40 | 10 | — | 30 | 20 |
| EN | — | 40 | 10 | — | 20 | 30 |
| EO | — | 30 | 40 | — | 20 | 10 |
| EP | — | 30 | 40 | — | 10 | 20 |
| EQ | — | 30 | 20 | — | 40 | 10 |
| ER | — | 30 | 20 | — | 10 | 40 |
| ES | — | 30 | 10 | — | 40 | 20 |
| ET | — | 30 | 10 | — | 20 | 40 |
| EU | — | 20 | 40 | — | 30 | 10 |
| EV | — | 20 | 40 | — | 10 | 30 |
| EW | — | 20 | 30 | — | 40 | 10 |
| EX | — | 20 | 30 | — | 10 | 40 |
| EY | — | 20 | 10 | — | 40 | 30 |
| EZ | — | 20 | 10 | — | 30 | 40 |
| FA | — | 10 | 40 | — | 30 | 20 |
| FB | — | 10 | 40 | — | 20 | 30 |
| FC | — | 10 | 30 | — | 40 | 20 |
| FD | — | 10 | 30 | — | 20 | 40 |
| FE | — | 10 | 20 | — | 40 | 30 |
| FF | — | 10 | 20 | — | 30 | 40 |
| FG | — | 40 | — | 30 | 20 | 10 |
| FH | — | 40 | — | 30 | 10 | 20 |
| FI | — | 40 | — | 20 | 30 | 10 |
| FJ | — | 40 | — | 20 | 10 | 30 |
| FK | — | 40 | — | 10 | 30 | 20 |
| FL | — | 40 | — | 10 | 20 | 30 |
| FM | — | 30 | — | 40 | 20 | 10 |
| FN | — | 30 | — | 40 | 10 | 20 |
| FO | — | 30 | — | 20 | 40 | 10 |
| FP | — | 30 | — | 20 | 10 | 40 |
| FQ | — | 30 | — | 10 | 40 | 20 |
| FR | — | 30 | — | 10 | 20 | 40 |
| FS | — | 20 | — | 40 | 30 | 10 |
| FT | — | 20 | — | 40 | 10 | 30 |
| FU | — | 20 | — | 30 | 40 | 10 |
| FV | — | 20 | — | 30 | 10 | 40 |
| FW | — | 20 | — | 10 | 40 | 30 |
| FX | — | 20 | — | 10 | 30 | 40 |
| FY | — | 10 | — | 40 | 30 | 20 |
| FZ | — | 10 | — | 40 | 20 | 30 |
| GA | — | 10 | — | 30 | 40 | 20 |
| GB | — | 10 | — | 30 | 20 | 40 |
| GC | — | 10 | — | 20 | 40 | 30 |

| | Liquid components in % of total liquid component | | | | |
|---|---|---|---|---|---|
| | Water or flavored water* | Tea or herbal tea or tea/herbal tea blend | Fuit juice or fruit juice/ vegetable juice blend | Animal milk or plant milk or liquid creamers or plant sap or blends thereof | Brewed liquid coffees | Alcohol containing liquids |
| GD | — | 10 | — | 20 | 30 | 40 |
| GE | — | — | 40 | 30 | 20 | 10 |
| GF | — | — | 40 | 30 | 10 | 20 |
| GG | — | — | 40 | 20 | 30 | 10 |
| GH | — | — | 40 | 20 | 10 | 30 |
| GI | — | — | 40 | 10 | 30 | 20 |
| GJ | — | — | 40 | 10 | 20 | 30 |
| GK | — | — | 30 | 40 | 20 | 10 |
| GL | — | — | 30 | 40 | 10 | 20 |
| GM | — | — | 30 | 20 | 40 | 10 |
| GN | — | — | 30 | 20 | 10 | 40 |
| GO | — | — | 30 | 10 | 40 | 20 |
| GP | — | — | 30 | 10 | 20 | 40 |
| GQ | — | — | 20 | 40 | 30 | 10 |
| GR | — | — | 20 | 40 | 10 | 30 |
| GS | — | — | 20 | 30 | 40 | 10 |
| GT | — | — | 20 | 30 | 10 | 40 |
| GU | — | — | 20 | 10 | 40 | 30 |
| GV | — | — | 20 | 10 | 30 | 40 |
| GW | — | — | 10 | 40 | 30 | 20 |
| GX | — | — | 10 | 40 | 20 | 30 |
| GY | — | — | 10 | 30 | 40 | 20 |
| GZ | — | — | 10 | 30 | 20 | 40 |
| HA | — | — | 10 | 20 | 40 | 30 |
| HB | — | — | 10 | 20 | 30 | 40 |
| HC | — | 80 | 5 | 5 | 5 | 5 |
| HD | — | 60 | 10 | 10 | 10 | 10 |
| HE | — | 40 | 15 | 15 | 15 | 5 |
| HF | — | 15 | 40 | 15 | 15 | 15 |
| HI | — | 15 | 15 | 40 | 15 | 15 |
| HJ | — | 15 | 15 | 15 | 40 | 15 |
| HK | — | 15 | 15 | 15 | 15 | 40 |
| HL | — | 10 | 60 | 10 | 10 | 10 |
| HM | — | 10 | 10 | 60 | 10 | 10 |
| HN | — | 10 | 10 | 10 | 60 | 10 |
| HO | — | 10 | 10 | 10 | 10 | 60 |
| HP | — | 5 | 80 | 5 | 5 | 5 |
| HQ | — | 5 | 5 | 80 | 5 | 5 |
| HR | — | 5 | 5 | 5 | 80 | 5 |
| HS | — | 5 | 5 | 5 | 5 | 80 |

The solid pieces components are selected from (a) crystal boba (based on konjac and/or agar), (b) fruit pieces or slices, or (c) tea leaves or herbal tea leaves (or non-leaf portions that are typically brewed for herbal teas). The solid pieces for the crystal boba are typically from 6 mm in diameter to 15 mm in diameter and may be of a diameter selected from 6 mm, 6.5 mm, 7 mm, 7.5 mm, 8 mm, 8.5 mm, 9 mm, 9.5 mm, 10 mm, 10.5 mm, 11 mm, 11.5 mm, 12 min, 12.5 mm, 13 mm, 13.5 mm, 14 mm, 14.5 mm, and 15 mm and each range that selects one of the foregoing (other than the 6 mm size) as an upper limit and one of the foregoing (other than the 15 mm size) as a lower limit, provided the upper limit chosen is greater than the lower limit chosen is deemed as a specifically disclosed range for the crystal boba. By way of example and not limitation, the crystal boba size range may be selected from any of the following:

*in the table below, variations where multiple liquid components include a "water or flavored water have been omitted to reduce the table size but are contemplated as well.

(a) 6 mm-15 mm, 6 mm-14.5 mm, 6 mm-14 mm, 6 mm-13.5 mm, 6 mm-13 mm, 6 mm-12.5 mm, 6 mm-12 mm, 6 mm-11.5 mm, 6 mm-11 mm, 6 mm-10.5 mm, 6 mm-10 mm, 6 mm-9.5 mm, 6 mm-9 mm, 6 mm-8.5 mm, 6 mm-8 mm, 6 mm-7.5 mm, 6 mm-7 mm, 6 mm-6.5 mm;

(b) 6.5 mm-15 mm, 6.5 mm-14.5 mm, 6.5 mm-14 mm, 6.5 mm-13.5 mm, 6.5 mm-13 mm, 6.5 mm-12.5 mm, 6.5 mm-12 mm, 6.5 mm-11.5 mm, 6.5 mm-11 mm, 6.5 mm-10.5 mm, 6.5 mm-10 mm, 6.5 mm-9.5 mm, 6.5 mm-9 mm, 6.5 mm-8.5 mm, 6.5 mm-8 mm, 6.5 mm-7.5 mm, 6.5 mm-7 mm;

(c) 7 mm-15 mm, 7 mm-14.5 mm, mm-14 mm, 7 mm-13.5 mm, 7 mm-13 mm, 7 mm-12.5 mm, 7 mm-12 mm, 7 mm-11.5 mm, 7 mm-11 mm, 7 mm-10.5 mm, 7 mm-10 mm, 7 mm-9.5 mm, 7 mm-9 mm, 7 mm-8.5 mm, 7 mm-8 mm, 7 mm-7.5 mm;

(d) 7.5 mm-15 mm, 7.5 mm-14.5 mm, 7.5 mm-14 mm, 7.5 mm-13.5 mm, 7.5 mm-13 mm, 7.5 mm-12.5 mm, 7.5 mm-12 mm, 7.5 mm-11.5 mm, 7.5 mm-11 mm, 7.5 mm-10.5 mm, 7.5 mm-10 mm, 7.5 mm-9.5 mm, 7.5 mm-9 mm, 7.5 mm-8.5 mm, 7.5 mm-8 mm;

(e) 8 mm-15 mm, 8 mm-14.5 mm, 8 mm-14 mm, 8 mm-13.5 mm, 8 mm-13 mm, 8 mm-12.5 mm, 8 mm-12 mm, 8 mm-11.5 mm, 8 mm-11 mm, 8 mm-10.5 mm, 8 mm-10 mm, 8 mm-9.5 mm, 8 mm-9 mm, 8 mm-8.5 mm;

(f) 8.5 mm-15 mm, 8.5 mm-14.5 mm, 8.5 mm-14 mm, 8.5 mm-13.5 mm, 8.5 mm-13 mm, 8.5 mm-12.5 mm, 8.5 mm-12 mm, 8.5 mm-11.5 mm, 8.5 mm-11 mm, 8.5 mm-10.5 mm, 8.5 mm-10 mm, 8.5 mm-9.5 mm, 8.5 mm-9 mm;
(g) 9 mm-15 mm, 9 mm-14.5 mm, 9 mm-14 mm, 9 mm-13.5 mm, 9 mm-13 mm, 9 mm-12.5 mm, 9 mm-12 mm, 9 mm-11.5 mm, 9 mm-11 mm, 9 mm-10.5 mm, 9 mm-10 mm, 9 mm-9.5 mm;
(h) 9.5 mm-15 mm, 9.5 mm-14.5 mm, 9.5 mm-14 mm, 9.5 mm-13.5 mm, 9.5 mm-13 mm, 9.5 mm-12.5 mm, 9.5 mm-12 mm, 9.5 mm-11.5 mm, 9.5 mm-11 mm, 9.5 mm-10.5 mm, 9.5 mm-10 mm;
(i) 10 mm-15 mm, 10 mm-14.5 mm, 10 mm-14 mm, 10 mm-13.5 mm, 10 mm-13 mm, 10 mm-12.5 mm, 10 mm-12 mm, 10 mm-11.5 mm, 10 mm-11 mm, 10 mm-10.5 mm;
(j) 10.5 mm-15 mm, 10.5 mm-14.5 mm, 10.5 mm-14 mm, 10.5 mm-13.5 mm, 10.5 mm-13 mm, 10.5 mm-12.5 mm, 10.5 mm-12 mm, 10.5 mm-11.5 mm, 10.5 mm-11 mm;
(k) 11 mm-15 mm, 11 mm-14.5 mm, 11 mm-14 mm, 11 mm-13.5 mm, 11 mm-13 mm, 11 mm-12.5 mm, 11 mm-12 mm, 11 mm-11.5 mm;
(l) 11.5 mm-15 mm, 11.5 mm-14.5 mm, 11.5 mm-14 mm, 11.5 mm-13.5 mm, 11.5 mm-13 mm, 11.5 mm-12.5 mm, 11.5 mm-12 mm;
(m) 12 mm-15 mm, 12 mm-14.5 mm, 12 mm-14 mm, 12 mm-13.5 mm, 12 mm-13 mm, 12 mm-12.5 mm;
(n) 12.5 mm-15 mm, 12.5 mm-14.5 mm, 12.5 mm-14 mm, 12.5 mm-13.5 mm, 12.5 mm-13 mm;
(o) 13 mm-15 mm, 13 mm-14.5 mm, 13 mm-14 mm, 13 mm-13.5 mm;
(p) 13.5 mm-15 mm, 13.5 mm-14.5 mm, 13.5 mm-14 mm;
(q) 14 mm-15 mm, 14 mm-14.5 mm; and
(r) 14.5 mm 15 mm.

While some stray bobas of lesser size than the specified lower limits are possible, and their presence does not remove the product from within the scope of the invention, the large majority of the bobas are at or greater than the minimum of the size range chosen as a limiting range. However, the product preferably contains bobas that are only within the size range chosen as the limitation. Preferably, if bobas below the minimum of a given size range limitation are in fact present, the size range limitation is met if at least some, preferably at least 20%, more preferably at least 25%, still more preferably at least 40%, even more preferably at least 50%, even more preferably at least 60%, yet more preferably at least 75%, still more preferably at least 80%, even more preferably at least 90%, still more preferably at least 95%, yet more preferably at least 99% of the bobas (by weight) are at or greater than the minimum of that range. In contrast, as to the upper limit of the range, all of the bobas should be at or below the maximum of the particular range for the product to be within the stated range. The bobas used in the boba containing embodiments of the invention are crystal boba which retain their shape, taste, texture and mouthfeel relative to such fresh crystal boba even after being exposed to the HPP processing step and even after combining with the other components and being stored for extended periods. These extended periods are at least as long as the Labelled Expiration Date, and preferably at least as long as the relevant Actual Expiration Date.

The solid pieces of fruit or fruit slices are not typically spherical, but are various shapes that may be, without limitation, spherical, ovoid, cylindrical, cubical, prismlike, or a conic section of any of the foregoing or a multitude of other shapes. For these solid pieces of fruit or fruit slices, they have at least one dimension which is at least equal to or larger than 6 mm AND no dimension that is larger than 25 mm. In other words, if the shape were a sphere, the diameter would no smaller than 6 mm and no larger than 25 mm. For simplicity, the present invention will be described in terms of the size of the fruit slices or solid pieces being of a specified diameter, but it is to be understood that the for the size of these pieces to be within the present invention, these pieces have at least one dimension of at least the minimum size and no dimension greater than the maximum size. As stated above, the fruit piece/slice size range is from 6 mm to 25 mm, inclusive and may be of a diameter selected from 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 16.5 mm, 17 mm, 17.5 mm, 18 mm, 18.5 m, 19 mm, 19.5 mm, 20 mm, 20.5 mm, 21 mm, 21.5 mm, 22 mm, 22.5 mm, 23 mm, 23.5 mm, 24 mm, 24.5 mm, and 25 mm, and each range that selects one of the foregoing (other than the 6 mm size) as an upper limit and one of the foregoing (other than the 25 mm size) as a lower limit, provided the upper limit chosen is greater than the lower limit chosen is deemed as a specifically disclosed range for the fruit slices/pieces. By way of example and not limitation, the fruit slices/pieces size range may be selected from any of the following:

(a) 6 mm 25 mm, 6 mm 24.5 mm, 6 mm 24 mm, 6 mm 23.5 mm, 6 mm 23 mm, 6 mm-22.5 mm, 6 mm 22 mm, 6 mm 21.5 mm, 6 mm 21 mm, 6 mm 20.5 mm, 6 mm 20 mm, 6 mm 19.5 mm, 6 mm 19 mm, 6 mm 18.5 mm, 6 mm 18 mm, 6 mm 17.5 mm, 6 mm 17 mm, 6 mm 16.5 mm, 6 mm 16 mm, 6 mm 15.5 mm, 6 mm 15 mm, 6 mm-14.5 mm, 6 mm-14 mm, 6 mm-13.5 mm, 6 mm-13 mm, 6 mm-12.5 mm, 6 mm-12 mm, 6 mm-11.5 mm, 6 mm-11 mm, 6 mm-10.5 mm, 6 mm-10 mm, 6 mm-9.5 mm, 6 mm-9 mm, 6 mm-8.5 mm, 6 mm-8 mm, 6 mm-7.5 mm, 6 mm-7 mm, 6 mm-6.5 mm;

(b) 6.5 mm-25 mm, 6.5 mm-24.5 mm, 6.5 mm-24 mm, 6.5 mm-23.5 mm, 6.5 mm-23 mm, 6.5 mm-22.5 mm, 6.5 mm-22 mm, 6.5 mm-21.5 mm, 6.5 mm-21 mm, 6.5 mm-20.5 mm, 6.5 mm-20 mm, 6.5 mm-19.5 mm, 6.5 mm-19 mm, 6.5 mm-18.5 mm, 6.5 mm-18 mm, 6.5 mm-17.5 mm, 6.5 mm-17 mm, 6.5 mm-16.5 mm, 6.5 mm-16 mm, 6.5 mm-15.5 mm, 6.5 mm-15 mm, 6.5 mm-14.5 mm, 6.5 mm-14 mm, 6.5 mm-13.5 mm, 6.5 mm-13 mm, 6.5 mm-12.5 mm, 6.5 mm-12 mm, 6.5 mm-11.5 mm, 6.5 mm-11 mm, 6.5 mm-10.5 mm, 6.5 mm-10 mm, 6.5 mm-9.5 mm, 6.5 mm-9 mm, 6.5 mm-8.5 mm, 6.5 mm-8 mm, 6.5 mm-7.5 mm, 6.5 mm-7 mm;

(c) 7 mm-25 mm, 7 mm-24.5 mm, 7 mm-24 mm, 7 mm-23.5 mm, 7 mm-23 mm, 7 mm-22.5 mm, 7 mm-22 mm, 7 mm-21.5 mm, 7 mm-21 mm, 7 mm-20.5 mm, 7 mm-20 mm, 7 mm-19.5 mm, 7 mm-19 mm, 7 mm-18.5 mm, 7 mm-18 mm, 7 mm-17.5 mm, 7 mm-17 mm, 7 mm-16.5 mm, 7 mm-16 mm, 7 mm-15.5 mm, 7 mm-15 mm, 7 mm-14.5 mm, 7 mm-14 mm, 7 mm-13.5 mm, 7 mm-13 mm, 7 mm-12.5 mm, 7 mm-12 mm, 7 mm-11.5 mm, 7 mm-11 mm, 7 mm-10.5 mm, 7 mm-10 mm, 7 mm-9.5 mm, 7 mm-9 mm, 7 mm-8.5 mm, 7 mm-8 mm, 7 mm-7.5 mm;

(d) 7.5 mm-25 mm, 7.5 mm-24.5 mm, 7.5 mm-24 mm, 7.5 mm-23.5 mm, 7.5 mm-23 mm, 7.5 mm-22.5 mm, 7.5 mm-22 mm, 7.5 mm-21.5 mm, 7.5 mm-21 mm, 7.5 mm-20.5 mm, 7.5 mm-20 mm, 7.5 mm-19.5 mm, 7.5 mm-19 mm, 7.5 mm-18.5 mm, 7.5 mm-18 mm, 7.5 mm-17.5 mm, 7.5 mm-17 mm, 7.5 mm-16.5 mm, 7.5 mm-16 mm, 7.5 mm-15.5 mm, 7.5 mm-15 mm, 7.5 mm-14.5 mm, 7.5 mm-14 mm, 7.5 mm-13.5 mm, 7.5 mm-13 mm, 7.5 mm-12.5 mm, 7.5 mm-12 mm, 7.5 mm-11.5 mm, 7.5 mm-11 mm, 7.5 mm-10.5 mm, 7.5 mm-10 mm, 7.5 mm-9.5 mm, 7.5 mm-9 mm, 7.5 mm-8.5 mm, 7.5 mm-8 mm;

(e) 8 mm-25 mm, 8 mm-24.5 mm, 8 mm-24 mm, 8 mm-23.5 mm, 8 mm-23 mm, 8 mm-22.5 mm, 8 mm-22 mm, 8 mm-21.5 mm, 8 mm-21 mm, 8 mm-20.5 mm, 8 mm-20 mm, 8 mm-19.5 mm, 8 mm-19 mm, 8 mm-18.5 mm, 8 mm-18 mm, 8 mm-17.5 mm, 8 mm-17 mm, 8 mm-16.5 mm, 8 mm-16 mm, 8 mm-15.5 mm, 8 mm-15 mm, 8 mm-14.5 mm, 8 mm-14 mm, 8 mm-13.5 mm, 8 mm-13 mm, 8 mm-12.5 mm, 8 mm-12 mm, 8 mm-11.5 mm, 8 mm-11 mm, 8 mm-10.5 mm, 8 mm-10 mm, 8 mm-9.5 mm, 8 mm-9 mm, 8 mm-8.5 mm;

(f) 8.5 mm-25 mm, 8.5 mm-24.5 mm, 8.5 mm-24 mm, 8.5 mm-23.5 mm, 8.5 mm-23 mm, 8.5 mm-22.5 mm, 8.5 mm-22 mm, 8.5 mm-21.5 mm, 8.5 mm-21 mm, 8.5 mm-20.5 mm, 8.5 mm-20 mm, 8.5 mm-19.5 mm, 8.5 mm-19 mm, 8.5 mm-18.5 mm, 8.5 mm-18 mm, 8.5 mm-17.5 mm, 8.5 mm-17 mm, 8.5 mm-16.5 mm, 8.5 mm-16 mm, 8.5 mm-15.5 mm, 8.5 mm-15 mm, 8.5 mm-14.5 mm, 8.5 mm-14 mm, 8.5 mm-13.5 mm, 8.5 mm-13 mm, 8.5 mm-12.5 mm, 8.5 mm-12 mm, 8.5 mm-11.5 mm, 8.5 mm-11 mm, 8.5 mm-10.5 mm, 8.5 mm-10 mm, 8.5 mm-9.5 mm, 8.5 mm-9 mm;

(g) 9 mm-25 mm, 9 mm-24.5 mm, 9 mm-24 mm, 9 mm-23.5 mm, 9 mm-23 mm, 9 mm-22.5 mm, 9 mm-22 mm, 9 mm-21.5 mm, 9 mm-21 mm, 9 mm-20.5 mm, 9 mm-20 mm, 9 mm-19.5 mm, 9 mm-19 mm, 9 mm-18.5 mm, 9 mm-18 mm, 9 mm-17.5 mm, 9 mm-17 mm, 9 mm-16.5 mm, 9 mm-16 mm, 9 mm-15.5 mm, 9 mm-15 mm, 9 mm-14.5 mm, 9 mm-14 mm, 9 mm-13.5 mm, 9 mm-13 mm, 9 mm-12.5 mm, 9 mm-12 mm, 9 mm-11.5 mm, 9 mm-11 mm, 9 mm-10.5 mm, 9 mm-10 mm, 9 mm-9.5 mm;

(h) 9.5 mm-25 mm, 9.5 mm-24.5 mm, 9.5 mm-24 mm, 9.5 mm-23.5 mm, 9.5 mm-23 mm, 9.5 mm-22.5 mm, 9.5 mm-22 mm, 9.5 mm-21.5 mm, 9.5 mm-21 mm, 9.5 mm-20.5 mm, 9.5 mm-20 mm, 9.5 mm-19.5 mm, 9.5 mm-19 mm, 9.5 mm-18.5 mm, 9.5 mm-18 mm, 9.5 mm-17.5 mm, 9.5 mm-17 mm, 9.5 mm-16.5 mm, 9.5 mm-16 mm, 9.5 mm-15.5 mm, 9.5 mm-15 mm, 9.5 mm-14.5 mm, 9.5 mm-14 mm, 9.5 mm-13.5 mm, 9.5 mm-13 mm, 9.5 mm-12.5 mm, 9.5 mm-12 mm, 9.5 mm-11.5 mm, 9.5 mm-11 mm, 9.5 mm-10.5 mm, 9.5 mm-10 mm;

(i) 10 mm-25 mm, 10 mm-24.5 mm, 10 mm-24 mm, 10 mm-23.5 mm, 10 mm-23 mm, 10 mm-22.5 mm, 10 mm-22 mm, 10 mm-21.5 mm, 10 mm-21 mm, 10 mm-20.5 mm, 10 mm-20 mm, 10 mm-19.5 mm, 10 mm-19 mm, 10 mm-18.5 mm, 10 mm-18 mm, 10 mm-17.5 mm, 10 mm-17 mm, 10 mm-16.5 mm, 10 mm-16 mm, 10 mm-15.5 mm, 10 mm-15 mm, 10 mm-14.5 mm, 10 mm-14 mm, 10 mm-13.5 mm, 10 mm-13 mm, 10 mm-12.5 mm, 10 mm-12 mm, 10 mm-11.5 mm, 10 mm-11 mm, 10 mm-10.5 mm;

(j) 10.5 mm-25 mm, 10.5 mm-24.5 mm, 10.5 mm-24 mm, 10.5 mm-23.5 mm, 10.5 mm-23 mm, 10.5 mm-22.5 mm, 10.5 mm-22 mm, 10.5 mm-21.5 mm, 10.5 mm-21 mm, 10.5 mm-20.5 mm, 10.5 mm-20 mm, 10.5 mm-19.5 mm, 10.5 mm-19 mm, 10.5 mm-18.5 mm, 10.5 mm-18 mm, 10.5 mm-17.5 mm, 10.5 mm-17 mm, 10.5 mm-16.5 mm, 10.5 mm-16 mm, 10.5 mm-15.5 mm, 10.5 mm-15 mm, 10.5 mm-14.5 mm, 10.5 mm-14 mm, 10.5 mm-13.5 mm, 10.5 mm-13 mm, 10.5 mm-12.5 mm, 10.5 mm-12 mm, 10.5 mm-11.5 mm, 10.5 mm-11 mm;

(k) 11 mm-25 mm, 11 mm-24.5 mm, 11 mm-24 mm, 11 mm-23.5 mm, 11 mm-23 mm, 11 mm-22.5 mm, 11 mm-22 mm, 11 mm-21.5 mm, 11 mm-21 mm, 11 mm-20.5 mm, 11 mm-20 mm, 11 mm-19.5 mm, 11 mm-19 mm, 11 mm-18.5 mm, 11 mm-18 mm, 11 mm-17.5 mm, 11 mm-17 mm, 11 mm-16.5 mm, 11 mm-16 mm, 11 mm-15.5 mm, 11 mm-15 mm, 11 mm-14.5 mm, 11 mm-14 mm, 11 mm-13.5 mm, 11 mm-13 mm, 11 mm-12.5 mm, 11 mm-12 mm, 11 mm-11.5 mm;

(l) 11.5 mm-25 mm, 11.5 mm-24.5 mm, 11.5 mm-24 mm, 11.5 mm-23.5 mm, 11.5 mm-23 mm, 11.5 mm-22.5 mm, 11.5 mm-22 mm, 11.5 mm-21.5 mm, 11.5 mm-21 mm, 11.5 mm-20.5 mm, 11.5 mm-20 mm, 11.5 mm-19.5 mm, 11.5 mm-19 mm, 11.5 mm-18.5 mm, 11.5 mm-18 mm, 11.5 mm-17.5 mm, 11.5 mm-17 mm, 11.5 mm 16.5 mm, 11.5 mm-16 mm, 11.5 mm-15.5 mm, 11.5 mm-15 mm, 11.5 mm-14.5 mm, 11.5 mm-14 mm, 11.5 mm-13.5 mm, 11.5 mm-13 mm, 11.5 mm-12.5 mm, 11.5 mm-12 mm;

(m) 12 mm-25 mm, 12 mm-24.5 mm, 12 mm-24 mm, 12 mm-23.5 mm, 12 mm-23 mm, 12 mm-22.5 mm, 12 mm-22 mm, 12 mm-21.5 mm, 12 mm-21 mm, 12 mm-20.5 mm, 12 mm-20 mm, 12 mm-19.5 mm, 12 mm-19 mm, 12 mm-18.5 mm, 12 mm-18 mm, 12 mm-17.5 mm, 12 mm-17 mm, 12 mm-16.5 mm, 12 mm-16 mm, 12 mm-15.5 mm, 12 mm-15 mm, 12 mm-14.5 mm, 12 mm-14 mm, 12 mm-13.5 mm, 12 mm-13 mm, 12 mm-12.5 mm;

(n) 12.5 mm-25 mm, 12.5 mm-24.5 mm, 12.5 mm-24 mm, 12.5 mm-23.5 mm, 12.5 mm-23 mm, 12.5 mm-22.5 mm, 12.5 mm-22 mm, 12.5 mm-21.5 mm, 12.5 mm-21 mm, 12.5 mm-20.5 mm, 12.5 mm-20 mm, 12.5 mm-19.5 mm, 12.5 mm-19 mm, 12.5 mm-18.5 mm, 12.5 mm-18 mm, 12.5 mm-17.5 mm, 12.5 mm-17 mm, 12.5 mm-16.5 mm, 12.5 mm-16 mm, 12.5 mm-15.5 mm, 12.5 mm-15 mm, 12.5 mm-14.5 mm, 12.5 mm-14 mm, 12.5 mm-13.5 mm, 12.5 mm-13 mm;

(o) 13 mm-25 mm, 13 mm-24.5 mm, 13 mm-24 mm, 13 mm-23.5 mm, 13 mm-23 mm, 13 mm-22.5 mm, 13 mm-22 mm, 13 mm-21.5 mm, 13 mm-21 mm, 13 mm-20.5 mm, 13 mm-20 mm, 13 mm-19.5 mm, 13 mm-19 mm, 13 mm-18.5 mm, 13 mm-18 mm, 13 mm-17.5 mm, 13 mm-17 mm, 13 mm-16.5 mm, 13 mm-16 mm, 13 mm-15.5 mm, 13 mm-15 mm, 13 mm-14.5 mm, 13 mm-14 mm, 13 mm-13.5 mm;

(p) 13.5 mm-25 mm, 13.5 mm-24.5 mm, 13.5 mm-24 mm, 13.5 mm-23.5 mm, 13.5 mm-23 mm, 13.5 mm-22.5 mm, 13.5 mm-22 mm, 13.5 mm-21.5 mm, 13.5 mm-21 mm, 13.5 mm-20.5 mm, 13.5 mm-20 mm, 13.5 mm-19.5 mm, 13.5 mm-19 mm, 13.5 mm-18.5 mm, 13.5 mm-18 mm, 13.5 mm-17.5 mm, 13.5 mm-17 mm, 13.5 mm-16.5 mm, 13.5 mm-16 mm, 13.5 mm-15.5 mm, 13.5 mm-15 mm, 13.5 mm-14.5 mm, 13.5 mm-14 mm;

(q) 14 mm-25 mm, 14 mm-24.5 mm, 14 mm-24 mm, 14 mm-23.5 mm, 14 mm-23 mm, 14 mm-22.5 mm, 14 mm-22 mm, 14 mm-21.5 mm, 14 mm-21 mm, 14 mm-20.5 mm, 14 mm-20 mm, 14 mm-19.5 mm, 14 mm-19 mm, 14 mm-18.5 mm, 14 mm-18 mm, 14 mm-17.5 mm, 14 mm-17 mm, 14 mm-16.5 mm, 14 mm-16 mm, 14 mm-15.5 mm, 14 mm-15 mm, 14 mm-14.5 mm;

(r) 14.5 mm-25 mm, 14.5 mm-24.5 mm, 14.5 mm-24 mm, 14.5 mm-23.5 mm, 14.5 mm-23 mm, 14.5 mm-22.5 mm, 14.5 mm-22 mm, 14.5 mm-21.5 mm, 14.5 mm-21 mm, 14.5 mm-20.5 mm, 14.5 mm-20 mm, 14.5 mm-19.5 mm, 14.5 mm-19 mm, 14.5 mm-18.5 mm, 14.5 mm-18 mm, 14.5 mm-17.5 mm, 14.5 mm-17 mm, 14.5 mm-16.5 mm, 14.5 mm-16 mm, 14.5 mm-15.5 mm, 14.5 mm-15 mm;

(s) 15 mm-25 mm, 15 mm-24.5 mm, 15 mm-24 mm, 15 mm-23.5 mm, 15 mm-23 mm, 15 mm-22.5 mm, 15 mm-22 mm, 15 mm-21.5 mm, 15 mm-21 mm, 15 mm-20.5 mm, 15 mm-20 mm, 15 mm-19.5 mm, 15 mm-19 mm, 15 mm-18.5 mm, 15 mm-18 mm, 15 mm-17.5 mm, 15 mm-17 mm, 15 mm-16.5 mm, 15 mm-16 mm, 15 mm-15.5 mm;

(t) 15.5 mm-25 mm, 15.5 mm-24.5 mm, 15.5 mm-24 mm, 15.5 mm-23.5 mm, 15.5 mm-23 mm, 15.5 mm-22.5 mm, 15.5 mm-22 mm, 15.5 mm-21.5 mm, 15.5 mm-21 mm, 15.5 mm-20.5 mm, 15.5 mm-20 mm, 15.5 mm-19.5 mm, 15.5 mm-19 mm, 15.5 mm-18.5 mm, 15.5 mm-18 mm, 15.5 mm-17.5 mm, 15.5 mm-17 mm, 15.5 mm-16.5 mm, 15.5 mm-16 mm;

(u) 16 mm-25 mm, 16 mm-24.5 mm, 16 mm-24 mm, 16 mm-23.5 mm, 16 mm-23 mm, 16 mm-22.5 mm, 16 mm-22 mm, 16 mm-21.5 mm, 16 mm-21 mm, 16 mm-20.5 mm, 16 mm-20 mm, 16 mm-19.5 mm, 16 mm-19 mm, 16 mm-18.5 mm, 16 mm-18 mm, 16 mm-17.5 mm, 16 mm-17 mm, 16 mm-16.5;

(v) 16.5 mm-25 mm, 16.5 mm-24.5 mm, 16.5 mm-24 mm, 16.5 mm-23.5 mm, 16.5 mm-23 mm, 16.5 mm-22.5 mm, 16.5 mm-22 mm, 16.5 mm-21.5 mm, 16.5 mm-21 mm, 16.5 mm-20.5 mm, 16.5 mm-20 mm, 16.5 mm-19.5 mm, 16.5 mm-19 mm, 16.5 mm-18.5 mm, 16.5 mm-18 mm, 16.5 mm-17.5 mm, 16.5 mm-17 mm, 16 mm-16.5;

(w) 17 mm-25 mm, 17 mm-24.5 mm, 17 mm-24 mm, 17 mm-23.5 mm, 17 mm-23 mm, 17 mm-22.5 mm, 17 mm-22 mm, 17 mm-21.5 mm, 17 mm-21 mm, 17 mm-20.5 mm, 17 mm-20 mm, 17 mm 19.5 mm, 17 mm-19 mm, 17 mm-18.5 mm, 17 mm-18 mm, 17 mm-17.5 mm;

(x) 17.5 mm-25 mm, 17.5 mm-24.5 mm, 17.5 mm-24 mm, 17.5 mm-23.5 mm, 17.5 mm-23 mm, 17.5 mm-22.5 mm, 17.5 mm-22 mm, 17.5 mm-21.5 mm, 17.5 mm-21 mm, 17.5 mm-20.5 mm, 17.5 mm-20 mm, 17.5 mm-19.5 mm, 17.5 mm-19 mm, 17.5 mm-18.5 mm, 17.5 mm-18 mm;

(y) 18 mm-25 mm, 18 mm-24.5 mm, 18 mm-24 mm, 18 mm-23.5 mm, 18 mm-23 mm, 18 mm-22.5 mm, 18 mm-22 mm, 18 mm-21.5 mm, 18 mm-21 mm, 18 mm-20.5 mm, 18 mm-20 mm, 18 mm-19.5 mm, 18 mm-19 mm, 18 mm-18.5 mm;

(z) 18.5 mm-25 mm, 18.5 mm-24.5 mm, 18.5 mm-24 mm, 18.5 mm-23.5 mm, 18.5 mm-23 mm, 18.5 mm-22.5 mm, 18.5 mm-22 mm, 18.5 mm-21.5 mm, 18.5 mm-21 mm, 18.5 mm-20.5 mm, 18.5 mm-20 mm, 18.5 mm-19.5 mm, 18.5 mm-19 mm;

(aa) 19 mm-25 mm, 19 mm-24.5 mm, 19 mm-24 mm, 19 mm-23.5 mm, 19 mm-23 mm, 19 mm-22.5 mm, 19 mm-22 mm, 19 mm-21.5 mm, 19 mm-21 mm, 19 mm-20.5 mm, 19 mm-20 mm, 19 mm-19.5 mm;

(bb) 19.5 mm-25 mm, 19.5 mm-24.5 mm, 19.5 mm-24 mm, 19.5 mm-23.5 mm, 19.5 mm-23 mm, 19.5 mm-22.5 mm, 19.5 mm-22 mm, 19.5 mm-21.5 mm, 19.5 mm-21 mm, 19.5 mm-20.5 mm, 19.5 mm-20 mm;

(cc) 20 mm-25 mm, 20 mm-24.5 mm, 20 mm-24 mm, 20 mm-23.5 mm, 20 mm-23 mm, 20 mm-22.5 mm, 20 mm-22 mm, 20 mm-21.5 mm, 20 mm-21 mm, 20 mm-20.5 mm;

(dd) 20.5 mm-25 mm, 20.5 mm-24.5 mm, 20.5 mm-24 mm, 20.5 mm-23.5 mm, 20.5 mm-23 mm, 20.5 mm-22.5 mm, 20.5 mm-22 mm, 20.5 mm-21.5 mm, 20.5 mm-21 mm;

(ee) 21 mm-25 mm, 21 mm-24.5 mm, 21 mm-24 mm, 21 mm-23.5 mm, 21 mm-23 mm, 21 mm-22.5 mm, 21 mm-22 mm, 21 mm-21.5 mm;

(ff) 21.5 mm-25 mm, 21.5 mm-24.5 mm, 21.5 mm-24 mm, 21.5 mm-23.5 mm, 21.5 mm-23 mm, 21.5 mm-22.5 mm, 21.5 mm-22 mm;

(gg) 22 mm-25 mm, 22 mm-24.5 mm, 22 mm-24 mm, 22 mm-23.5 mm, 22 mm-23 mm, 22 mm-22.5 mm;

(hh) 22.5 mm 25 mm, 22.5 mm 24.5 mm, 22.5 mm 24 mm, 22.5 mm 23.5 mm, 22.5 mm-23 mm;

(ii) 23 mm 25 mm, 23 mm 24.5 mm, 23 mm 24 mm, 23 mm 23.5 mm;

(jj) 23.5 mm 25 mm, 23.5 mm 24.5 mm, 23.5 mm 24 mm;

(kk) 24 mm 25 mm, 24 mm 24.5 mm; and (ll) 24.5 mm 25 mm.

While some stray fruit pieces of lesser size than the specified lower limits are possible, and their presence does not remove the product from within the scope of the invention, the large majority of the fruit pieces are at or greater than the minimum of the size range chosen as a limiting range. However, when the product contains fruit pieces, preferably those fruit pieces are only within the size range chosen as the limitation. Preferably, if fruit pieces below the minimum of a given size range limitation are in fact present, the size range limitation is met if at least some, preferably at least 20%, more preferably at least 25%, still more preferably at least 40%, even more preferably at least 50%, even more preferably at least 60%, yet more preferably at least 75%, still more preferably at least 80%, even more preferably at least 90%, still more preferably at least 95%, yet more preferably at least 99% of the fruit pieces (by weight) are at or greater than the minimum of that range. In contrast, as to the upper limit of the range, all of the fruit pieces should be at or below the maximum of the particular range for the product to be within the stated range.

The fruits that are suitable for inclusion as the "solids" should generally have the characteristic that they will remain intact and/or maintain their flavor and texture when soaked in an ingestible liquid for an extended period, in particular for the time period of from the date of manufacture through at least the Label Expiration Date, more preferably at least through the Actual Expiration Date. Thus, while the Label Expiration Date is not a fixed date until the manufacturer labels the product, if the fruit pieces/slices maintain the stated characteristics through the Label Expiration Date, then such fruits are suitable for use in the present embodiments of the invention, although again, it is preferable that the fruit slices/pieces maintain the above referenced characteristics through the Actual Expiration Date. The solid pieces of fruit and fruit slices are generally selected from, without limitation, peach, nectarine, grapefruit, orange, lemon, citron, lime, kiwi, lychee, mango, apricot, passion fruit, papaya, pineapple, sugar cane, longan, dates, jujube, strawberry, blueberry, blackberry, raspberry, apple, pear, Asian pear, honeydew, and cantaloupe. Other fruits that that do not have these characteristics but are desirable from a flavor perspective can be pureed and used as part of the liquid base portion set forth above, but not as the separate "solid pieces".

Turning to the tea leaves (regular leaves, decaffeinated tea leaves, herbal tea leaves) that are added to the product as solid pieces during manufacture and are intended to be retained in the product as such through consumption of the beverage, are used in small amounts, typically in the range of less than 5 g, preferably 1 g to less than 5 g, more preferably 1.0 g to 3.0 g, still more preferably 1.3 g to 1.8 g per 354 ml bottle (12 fluid ounces). Larger sized bottles will use proportionately more and smaller sized bottles will use proportionately less. By way of example and not limitation, for a 177 ml (6 fluid ounce) bottle, one will use less than 2.5 g, preferably 0.5 g to less than 2.5 g, while for a 708 ml (24 fluid ounce) bottle will utilize less than 10 g, preferably 2 g to less than 10 g. For the other sized bottles, one will utilize the similarly corresponding proportionate amounts. When tea is being prepared in advance rather than in the course of the HPP processing, larger amounts of tea leaves per serving are required than when the tea leaves themselves are to be contained in the final product, generally 3.0 g or more of tea leaves per intended 354 ml (12 fluid ounce) serving can be measured out and brewed in per serving amounts or in bulk (such as generally 3 kg or more) for a 1,000 bottle bulk production batch of 354 ml (12 fluid ounce) bottles. Again, proportionately larger amounts are utilized for larger bottle sizes and proportionately smaller amounts are used for smaller bottle sizes. By way of example, when the tea is being prepared in advance, sufficient tea can be measured to produce 354 liters of tea and that volume of tea can be dispensed as the base liquid phase to 1000 bottles of 354 ml each with some excess remaining due to the volume displaced by the solids content of the bottles. Any excess can be used for filling additional bottles so that advanced accounting for reductions in volume needed because of the solids need not be taken into account when preparing the liquid portion. However, as described elsewhere herein, when the tea leaves are to reside in the product through consumption, and those tea leaves are exposed to the HPP step, a significantly lesser amount of tea leaves are used per serving, which reduces the amount of tea leaves to be measured out as under 3.0 g per 354 ml bottle. Such small amounts of dry tea leaves are very difficult to reliably and consistently measure in automated processes and therefore are carried out manually.

Where the various components are prepared in advance for later addition into the final container, any suitable container is usable. However, the final container into which the components are added and while in which final container the HPP technique is applied must be containers that are capable of transmitting the extreme (in the range of 200 MPa to 700 MPa) pressure to the contents without breaking, cracking, or permanently deforming under the pressure load. Such final containers are known from the existing HPP art and, of these, a particularly advantageous one is a polyethylene terephthalate (PET) bottle having a container wall thickness of from 0.1 mm to 0.9 mm, preferably 0.25 mm to 0.6 mm thickness (for example, without limitation, thickness of about 0.1 mm, about 0.15 mm, about 0.20 mm. about 0.25 mm, about 0.30 mm, about 0.35 mm, about 0.40 mm, about 0.45 mm, about 0.50 mm, about 0.55 mm, 0.60 mm, about 0.65 mm, about 0.70 mm, about 0.75 mm, about 0.80 mm, about 0.85 mm, about 0.90 mm) and having a volume of about 177 ml (6 fluid ounces), to about 750 ml (such as, without limitation, 177 ml (about 6 fluid ounces), 180 ml, 200 ml, 207 ml (7 fluid ounces), 210 ml, 225 ml, 236 ml (about 8 fluid ounces), 240 ml, 250 ml, 266 ml (about 9 fluid ounces), 270 ml, 275, 295 ml (about 10 fluid ounces), 300 ml, 325 ml (about 11 fluid ounces), 330 ml, 350 ml, 354 ml (about 12 fluid ounces), 360 ml, 375 ml, 384 ml (about 13 fluid ounces), 390 ml, 400 ml, 414 ml (about 14 fluid ounces), 420 ml, 425 ml, 443 ml (about 15 fluid ounces), 450 ml, 472 (about 16 fluid ounces), 475 ml, 480 ml, 500 ml, 502 ml (about 17 fluid ounces), 510 ml, 525 ml, 531 ml (about 18 fluid ounces), 540 ml, 550 ml, 561 ml (about 19 fluid ounces), 570 ml, 575 ml, 590 ml (about 20 fluid ounces), 600 ml, 619 ml (about 21 fluid ounces), 625 ml, 630 ml, 649 ml (about 22 fluid ounces), 650 ml, 675 ml, 678 ml (about 23 fluid ounces), 690 ml, 700 ml, 708 ml (about 24 fluid ounces), 720 ml, 737 ml (about 25 fluid ounces), and 750 ml. A suitable cap size is utilized, typically in the range of 30 mm to 48 mm, such as, without limitation, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, and 48 mm. Other container materials that are suitable include: PP (polypropylene), PE (polyethylene), HDPE (high-density polyethylene), LDPE (low-density polyethylene), APET (amorphous polyethylene terephthalate), and CPET (crystallized polyethylene). These other container materials may be used with the same wall thicknesses, bottle sizes, and cap sizes as set forth above for PET bottles.

Certain important aspects of the various embodiments of the inventive process for producing the products of the various embodiments of the invention are that the liquid phase and the solid pieces (boba and/or fruit and/or tea leaves, etc.) are placed into an HPP technique suitable container, the container is sealed, and the sealed container is subjected to the HPP technique. After completing the HPP technique, the sealed bottles are sent into the channels of distribution, and they remain sealed until opened by the consumer for consumption of the beverage. The following describes the process more fully, beginning with initially cleansing the bottles, but the steps prior to the joining of the base liquid and the solid pieces in the final container may be replaced by essentially alternative steps, and/or the order of conducting steps may be changed unless the context requires otherwise.

The bottle may be, and preferably is, cleaned in an aseptic environment. The bottle may be washed multiple times with a disinfectant solution (such as hydrogen peroxide, and/or if desired alcohol, ethanol or rubbing alcohol, but hydrogen peroxide is preferred) and water (any potable water is acceptable); then blown dry preferably using filtered air, but any other clean gas is acceptable as well. (Alternatively, previously cleaned (preferably aseptically cleaned) bottles may be purchased from known suppliers for use in the present processes.) The bottles may be removed from the cleaning line and put onto matrix style crates, for example, a crate which may accommodate 6 bottles by 8 bottles for a total of 48 bottles per crate, which crates are transported to a filing station. Alternatively, the clean and dried bottles may be transported to filling stations in any known means in the art so long as the sterility of the bottles is not adversely affected from that obtained from the cleansing and rinsing step just completed.

For beverage embodiments containing boba or fruit pieces/slices, for a 354 ml (about 12 fluid ounces) about 10 g to 100 g of boba or fruit, respectively, such as, without limitation, (a) 10 g to 100 g, 10 g to 95 g, 10 g to 90 g, 10 g to 85 g, 10 g to 80 g, 10 g to 75 g, 10 g to 70 g, 10 g to 65 g, 10 g to 60 g, 10 g to 55 g, 10 g to 50 g, 10 g to 45 g, 10 g to 40 g, 10 g to 35 g, 10 g to 30 g, 10 g to 25 g, 10 g to 20 g, 10 g to 15 g;

(b) 15 g to 100 g, 15 g to 95 g, 15 to 90 g, 15 g to 85 g, 15 g to 80 g, 15 g to 75 g, 15 g to 70 g, 15 g to 65 g, 15 g to 60 g, 15 g to 55 g, 15 g to 50 g, 15 g to 45 g, 15 g to 40 g, 15 g to 35 g, 15 g to 30 g, 15 g to 25 g, 15 g to 20 g;

(c) 20 g to 100 g, 20 g to 95 g, 20 g to 90 g, 20 g to 85 g, 20 g to 80 g, 20 g to 75 g, 20 g to 70 g, 20 g to 65 g, 20 g to 60 g, 20 g to 55 g, 20 g to 50 g, 20 g to 45 g, 20 g to 40 g, 20 g to 35 g, 20 g to 30 g, 20 g to 25 g;

(d) 25 g to 100 g, 25 g to 95 g, 25 g to 90 g, 25 g to 85 g, 25 g to 80 g, 25 g to 75 g, 25 g to 70 g, 25 g to 65 g, 25 g to 60 g, 25 g to 55 g, 25 g to 50 g, 25 g to 45 g, 25 g to 40 g, 25 g to 35 g, 25 g to 30 g;

(e) 30 g to 100 g, 30 g to 95 g, 30 g to 90 g, 30 g to 85 g, 30 g to 80 g, 30 g to 75 g, 30 g to 70 g, 30 g to 65 g, 30 g to 60 g, 30 g to 55 g, 30 g to 50 g, 30 g to 45 g, 30 g to 40 g, 30 g to 35 g;

(f) 35 g to 100 g, 35 g to 95 g, 35 g to 90 g, 35 g to 85 g, 35 g to 80 g, 35 g to 75 g, 35 g to 70 g, 35 g to 65 g, 35 g to 60 g, 35 g to 55 g, 35 g to 50 g, 35 g to 45 g, 35 g to 40 g;

(g) 40 g to 100 g, 40 g to 95 g, 40 g to 90 g, 40 g to 85 g, 40 g to 80 g, 40 g to 75 g, 40 g to 70 g, 40 g to 65 g, 40 g to 60 g, 40 g to 55 g, 40 g to 50 g, 40 g to 45 g;

(h) 45 g to 100 g, 45 g to 95 g, 45 g to 90 g, 45 g to 85 g, 45 g to 80 g, 45 g to 75 g, 45 g to 70 g, 45 g to 65 g, 45 g to 60 g, 45 g to 55 g, 45 g to 50 g;

(i) 50 g to 100 g, 50 g to 95 g, 50 g to 90 g, 50 g to 85 g, 50 g to 80 g, 50 g to 75 g, 50 g to 70 g, 50 g to 65 g, 50 g to 60 g, 50 g to 55 g;

(j) 55 g to 100 g, 55 g to 95 g, 55 g to 90 g, 55 g to 85 g, 55 g to 80 g, 55 g to 75 g, 55 g to 70 g, 55 g to 65 g, 55 g to 60 g;

(k) 60 g to 100 g, 60 g to 95 g, 60 g to 90 g, 60 g to 85 g, 60 g to 80 g, 60 g to 75 g, 60 g to 70 g, 60 g to 65 g;

(l) 65 g to 100 g, 65 g to 95 g, 65 g to 90 g, 65 g to 85 g, 65 g to 80 g, 65 g to 75 g, 65 g to 70 g;

(m) 70 g to 100 g, 70 g to 95 g, 70 g to 90 g, 70 g to 85 g, 70 g to 80 g, 70 g to 75 g;

(n) 75 g to 100 g, 75 g to 95 g, 75 g to 90 g, 75 g to 85 g, 75 g to 80 g;

(o) 80 g to 100 g, 80 g to 95 g, 80 g to 90 g, 80 g to 85 g;

(p) 85 g to 100 g, 85 g to 95 g, 85 g to 90 g;

(q) 90 g to 100 g, 90 g to 95 g; and;

(r) 95 g to 100 g are suitable, especially 45 g to 50 g, 50 g to 55 g, 55 g to 60 g, 60 g to 65 g, 65 g to 70 g, 70 g to 75 g, and 75 g to 80 g (Larger bottles will utilize amounts and ranges that are proportionately larger than the forgoing, and smaller bottles will utilize amounts and ranges that are proportionately smaller relative to the amounts and ranges set forth for the 354 ml (about 12 fluid ounce bottles.) These boba and fruit pieces/slices may be manually inserted per bottle (in any of the foregoing amounts (concerning the 354 ml bottle and proportionately larger or smaller amounts for the larger and smaller bottles respectively) e.g., about 40 g, 50 g, and 60 g, of pure boba or fruit pieces after draining), using a funnel to ensure bobas or fruits do not drop outside the bottle and/or stain the bottle opening. A sifting spoon with holes may be used to drain and insert boba and fruit pieces. If both boba and fruit pieces are being used in a single bottle, while each can be used in any of the forgoing amounts independent of the other, it is preferable that the total combined boba and fruit be used in the mounts indicated as when only boba or only fruit pieces are used. Fly way of example and not limiting, either boba or fruit pieces may be used in the range of 10 g to 100 g per bottle. While it is acceptable to use 100 g of boba and 100 g of fruit pieces in a single 354 ml (about 12 fluid ounce) bottle, it is generally desirable that the total of the boba and the fruit to be in the range of 10 g to 150 g. Again, proportionately larger amounts of boba and/or fruit pieces/slices as the foregoing are utilized for larger bottle sizes and proportionately smaller amounts are used for smaller bottle sizes.

For cold brewed tea (which is intended to mean tea leaves introduced into the final container with some base liquid added subsequently and the "brewing/extraction" of tea leaf principals during the HPP technique), 1.0 to 5.0 g of dried tea leaves may be manually inserted per bottle. In preferred embodiments of the cold brew tea beverage, the amount of dry tea leaves used may be selected from the ranges:

(a) 1.0 g to 5.0 g, 1.0 g to 4.5 g, 1.0 g to 4.0 g, 1.0 g to 3.5 g, 1.0 g to 3.0 g, 1.0 g to 2.5 g, 1.0 g to 2.0 g, 1.0 g to 1.5 g;

(b) 1.5 g to 5.0 g, 1.5 g to 4.5 g, 1.5 g to 4.0 g, 1.5 g to 3.5 g, 1.5 g to 3.0 g, 1.5 g to 2.5 g, 1.5 g to 2.0 g;

(c) 2.0 g to 5.0 g, 2.0 g to 4.5 g, 2.0 g to 4.0 g, 2.0 g to 3.5 g, 2.0 g to 3.0 g, 2.0 g to 2.5 g;

(d) 2.5 g to 5.0 g, 2.5 g to 4.5 g, 2.5 g to 4.0 g, 2.5 g to 3.5 g, 2.5 g to 3.0 g;

(e) 3.0 g to 5.0 g, 3.0 g to 4.5 g, 3.0 g to 4.0 g, 3.0 g to 3.5 g;

(f) 3.5 g to 5.0 g, 3.5 g to 4.5 g, 3.5 g to 4.0 g;

(g) 4.0 g to 5.0 g, 4.0 g to 4.5 g; and (h) 4.5 g to 5.0 g.

The tea leaves may be introduced into the final container utilizing any convenient method, including a specially customized spoon. An optional funnel may also be utilized to reduce wastage. The final container having the tea leaves therein can be placed in a sectioned crate for transport to a liquid filling line. Alternatively, the final containers with the tea leaves therein can be transported by any other suitable means to a liquid filling line. When desired, the containers intended for cold brewed tea may additionally have boba and/or solid pieces of fruits also introduced therein in accordance with the manner of filling the solid pieces for those products that are not intended for cold brewed purposes as set forth more fully hereinbelow.

To fill the bottles with liquid components, the bottles may be manually put onto the filling line, or they may be transported thereto by automated delivery mechanisms well known in the art. A liquid filling machine may fill each bottle with a suitable volume of liquid components, such as, without limitation about 340-353 ml of filtered water or tea in a 354 ml bottle (leaving only a small volume of headspace once the container is sealed) the liquid volume varying depending upon the amount of solids already in the container, and tightly cap each bottle. Filling can also be done manually or via automated means. It should be noted that the smaller the available headspace, the better, as the less the headspace volume the smaller the possibility for the pressure to be applied in the HPP technique to result in non-uniform pressures to result in the contents of the bottles during the HPP process. Significant differences in pressure from different directions within the sample being processed can result in an inability to retain the solid pieces shapes and textures when subjected to the high pressures of the process.

Once filled, the bottles are capped and sealed, the filled bottles are moved (either manually or via automated transports into High Pressure Processing equipment for application of the high pressures required by the various embodiments of the present invention. Labels can be applied to the bottles as is convenient for the particular operation, with labelling being applied between cleaning and filling, after sealing, before introduction into the HPP operation, or after the HPP operation is completed. Other timepoints for applying labeling are also possible, but not as desirable as one of the foregoing For beverage products that do not involve cold brewing of leaves in situ during the HPP technique, the following process is followed and generally follows the foregoing filling of the bottles except that the dry leaves are not utilized. More specifically, boba milk tea and fruit tea may be prepared by separately brewing tea leaves, in 65° C. to 93° C. (or any range constructed therefrom having a lower limit and an upper limit of such constructed range selected from the group consisting of 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., or 98° C. provided in each constructed range, the upper limit is greater than the lower limit) hot water for 5-23 minutes (or any range constructed therefrom having a lower limit and an upper limit of such constructed range selected from the group consisting of 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, and 23 minutes) ("hot brewed tea"). Thus hot brewed tea temperatures may be selected from (a) 65° C. to 98° C., 66° C. to 98° C., 67° C. to 98° C., 68° C. to 98° C., 69° C. to 98° C., 70° C. to 98° C., 71° C. to 98° C., 72° C. to 98° C., 73° C. to 98° C., 74° C. to 98° C., 75° C. to 98° C., 76° C. to 98° C., 77° C. to 98° C., 78° C. to 98° C., 79° C. to 98° C., 80° C. to 98° C., 81° C. to 98° C., 82° C. to 98° C., 83° C. to 98° C., 84° C. to 98° C., 85° C. to 98° C., 86° C. to 98° C., 87° C. to 98° C., 88° C. to 98° C., 89° C. to 98° C., 90° C. to 98° C., 91° C. to 98° C., 92° C. to 98° C., 93° C. to 98° C., 94° C. to 98° C., 95° C. to 98° C., 96° C. to 98° C., or 97° C. to 98° C.;

(b) 70° C. to 95° C., 71° C. to 95° C., 72° C. to 95° C., 73° C. to 95° C., 74° C. to 95° C., 75° C. to 95° C., 76° C. to 95° C., 77° C. to 95° C., 78° C. to 95° C., 79° C. to 95° C., 80° C. to 95° C., 81° C. to 95° C. 82° C. to 95° C., 83° C. to 95° C., 84° C. to 95° C., 85° C. to 95° C., 86° C. to 95° C., 87° C. to 95° C., 88° C. to 95° C., 89° C. to 95° C., 90° C. to 95° C., 91° C. to 95° C., 92° C. to 95° C., 93° C. to 95° C., 94° C. to 95° C.;

(c) 75° C. to 90° C., 76° C. to 90° C., 77° C. to 90° C., 78° C. to 90° C., 79° C. to 90° C., 80° C. to 90° C., 81° C. to 90° C., 82° C. to 90° C., 83° C. to 90° C., 84° C. to 90° C., 85° C. to 90° C., 86° C. to 90° C., 87° C. to 90° C., 88° C. to 90° C., 89° C. to 90° C.;

(d) 75° C. to 85° C., 76° C. to 85° C., 77° C. to 85° C., 78° C. to 85° C., 79° C. to 85° C., 80° C. to 85° C., 81° C. to 85° C., 82° C. to 85° C., 83° C. to 85° C., 84° C. to 85° C.;

(e) 77° C. to 83° C., 78° C. to 83° C., 79° C. to 83° C., 80° C. to 83° C., 81° C. to 83° C., 82° C. to 83° C.; and (f) 79° C. to 81° C., 80° C. to 81° C.;

hot brewing times can advantageously be chosen from (a) 5 minutes to 23 minutes, 6 minutes to 23 minutes, 7 minutes to 23 minutes, 8 minutes to 23 minutes, 9 minutes to 23 minutes, 10 minutes to 23 minutes, 11 minutes to 23 minutes, 12 minutes to 23 minutes, 13 minutes to 23 minutes, 14 minutes to 23 minutes, 15 minutes to 23 minutes, 16 minutes to 23 minutes, 17 minutes to 23 minutes, 18 minutes to 23 minutes, 19 minutes to 23 minutes, 20 minutes to 23 minutes, 21 minutes to 23 minutes, and 22 minutes to 23 minutes;

(b) 10 minutes to 20 minutes, 11 minutes to 20 minutes, 12 minutes to 20 minutes, 13 minutes to 20 minutes, 14 minutes to 20 minutes, 15 minutes to 20 minutes, 16 minutes to 20 minutes, 17 minutes to 20 minutes, 18 minutes to 20 minutes, 19 minutes to 20 minutes;

(c) 12 minutes to 17 minutes, 13 minutes to 17 minutes, 14 minutes to 17 minutes, 15 minutes to 17 minutes, 16 minutes to 17 minutes;

(d) 14 minutes to 16 minutes, or 15 minutes to 16 minutes.

A particularly advantageous brewing temperature here is 75° C. to 85° C., more preferably 77° C. to 83° C., even more preferably 78° C. to 82° C., still more preferably about 80° C. and a particularly preferred brewing time is 10 minutes to 20 minutes, more preferably 12 minutes to 17 minutes, still more preferably about 15 minutes. For this "hot brewed tea", the tea leaves may be brews in the form of a "tea bag" well known in the industry for making individual cups of tea, by utilizing a suitable number of such tea bags for the number of cups being brewed in a single batch. Alternatively, loose tea leaves in an amount corresponding to the weight of tea needed for a single batch of any particular size may be loaded into a porous bag of suitable size akin to a "large tea bag" which may be utilized for the brewing step. A third alternative is to introduce the requisite amount of tea leaves into a suitably sized device commonly known as a "French Press" frequently used in making small amounts of coffee. The leaves are combined with a suitable amount of hot water for the requisite batch size in a suitably sized "French Press," and allowed to steep for the requisite amount of time as indicated above. The French Press has a filter and a plunger, which when the plunger is depressed, the plunger moves the filter downward through the steeped leaves, trapping the wet leaves below the filter and separating the wet leaves from the bulk of the liquid tea formed in the steeping step. The so separated liquid tea can then be recovered and the wet leaves left behind can be discarded. When individual tea bags or a large single bag of tea leaves are used, they respective tea bags are withdrawn from the gross liquid of the batch and typically are, but not required to be, squeezed to recover adherent liquid tea, and the individual tea bags inclusive of the wet tea bags can be discarded. In the case of the large filter bags used in a larger bulk tea brewing process, the large bag may, after withdrawing the tea leaves from the brewed tea, be cleaned of the wet tea leaves and reused if desired for another batch. Combinations may be used to aid in efficiency such as utilizing tea bags or the larger bulk bag of tea leaves in a "French Press" device of suitable size which facilitates "squeezing" of the wet leaves to recover the residual adherent liquid tea and further facilitates the removal and discarding of the wet tea leaves. Depending on availability of suitably sized equipment, these brewing batches of the tea may be accomplished manually or via automated equipment. For example, about 1.5-6.3 g, such as 3.67 g, of tea leaves may be used with about 205-235 g, such as 223 g, water for a single 354 ml bottle. Alternatively, 1.5 kg to about 6.3 kg of tea leaves may be used with about 205 kg to about 235 kg of water for a 1,000 kg bottle tea steeping batch production. If desired with respect to the previously prepared tea, one can also truly "cook" the tea leaves as when the tea leaves are placed in a vessel with water and the temperature is raised and heat is continued to be applied during the brewing period.

Figure 2:
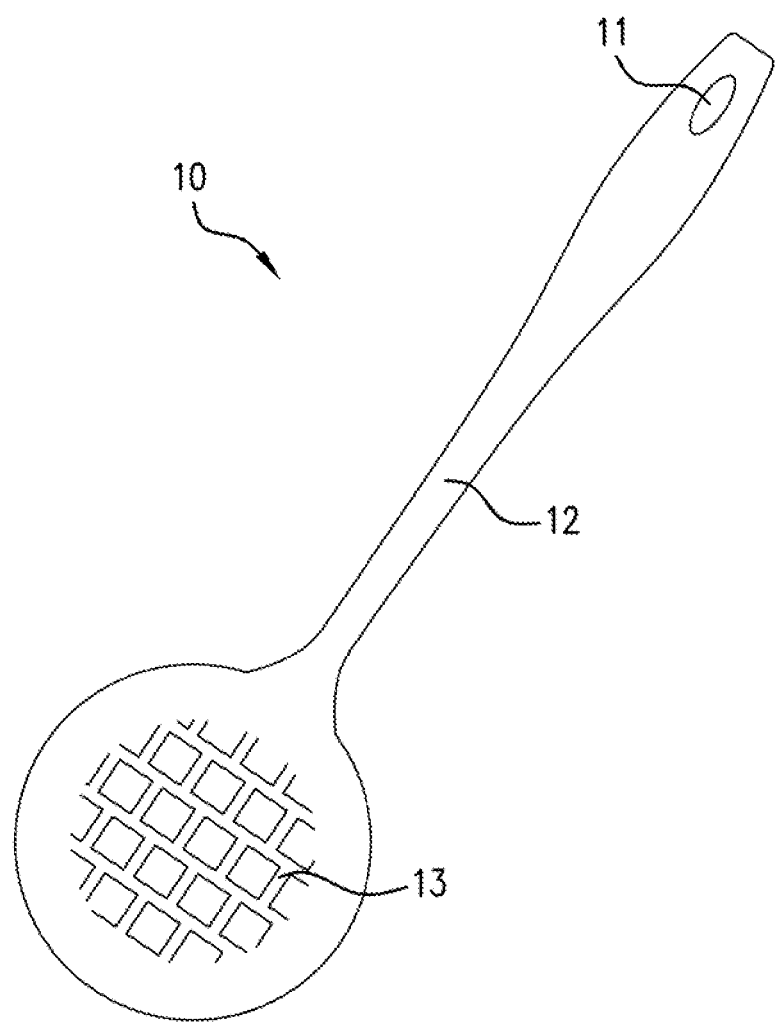
FIG. 2 is a top plan view of a sifting spoon for use in a filling step of an embodiment of the invention.

To prepare the boba milk tea, milk powder, milk base (used mostly outside the US as a replacement for milk in which the key ingredients include milk powder, vegetable oil, milk protein, lactose, and/or carbohydrates), and sweetener may be added to the previously brewed tea, which previously brewed tea (a) may have cooled to room temperature or (b) has not yet cooled to room temperature but then after the blending with the previously brewed tea may then be allowed to cool to room temperature. Cooling naturally to room temperature is more economical from an energy perspective, but forced cooling through refrigeration is more efficient from a production standpoint. Those of ordinary skill in the art can select either cooling method based on their own independent judgment. For example, about 51-108 g, such as 71 g, of milk powder, about 14-26 g, such as 18.5 g, of milk base, and about 7-16 g, such as 12.6 g, of sweetener (which may be a natural sugar, or 5-16 g, such as 6 g of a natural sugar substitute (such as stevia, mogrosides, etc.), 1-6 g, such as 3 g of an artificial sweetener (aka a high potency sweetener, such as cyclamate, aspartame, sucralose, etc) may be added to about 205-235 g, such as 223 g, water. Fresh animal milk (full fat, low fat, or fat-free), condensed milk, UHT milk, plant milks (such as soy milk, oat milk, almond milk, etc.) and creamers (inclusive of, without limitation, animal milk cream, plant milk-based creamers, and other non-dairy creamers) may be used in lieu of milk powder and/or milk base, when used as dry powders. If these are utilized as liquids, appropriate adjustments in the volume of water used should also be made. The prepared milk tea may be transferred to a holding container for later filling of final container bottles or transferred to a filling station for filling final container bottles or manually filled into final container bottles, in each case the final container bottles having had an appropriate amount of boba therein prior to filling with the milk tea. In those embodiments which want to exclude the fluid in which prepared boba may be stored, a slotted spoon/strainer spoon as shown in FIG. 2 may be used, while in those embodiments where the liquid in which the boba are stored is intended to be used, un unslotted spoon may be used. Alternatives to the slotted spoon may include colanders of appropriately sized holes to retain the boba and let the fluid be drained away.

Where both boba and fruit pieces/slices are intended to be in the milk tea, the boba and fruit pieces/slices are placed in the final container bottles prior to filling the final container bottles with the prepared milk tea. Where boba and/or fruit pieces/slices are intended to be included in a cold brewed milk tea end product, the boba and/or fruit pieces/slices are added along with the dry tea leaves, in any suitable order, and then the final container bottles are filled with the milk tea components (except that water is substituted for the brewed tea above); the HPP technique applied after the sealing of the filled final container bottles will result in a cold brewed milk tea having either or both boba and/or fruit pieces/slices along with the tea leaves therein. An alternative that is also an embodiment within the scope of the disclosed invention is any of the embodiments described in this paragraph that replace the "previously brewed tea" with water.

For preparation of fruit tea, tea leaves are previously brewed and (optionally) fruit juice (whether fresh juice, concentrated juice, not-from-concentrate juice, any of which may have or may not have been frozen) and optionally sweetener may be added thereto, either before or after the previously brewed tea has been allowed to cool to room temperature. If the fruit juice is added before the previously brewed tea has been allowed to cool, the blended tea and juice and optional sweetener is then allowed to cool naturally to room temperature. The mixture may be transferred to a holding container for later filling into final container bottles. Prior to the filling of the fruit tea (and optional sweetener) blend into the final container bottles, such final container bottles will have any of the desired boba and/or fruit pieces/slices added, and the tea fruit blend will then be added. In an alternative embodiment of the invention, the beverage is not really a "tea beverage" in that no tea is used, but the beverage consists of fruit juice, optionally additional water, and fruit slices/pieces, and may have boba additionally present. Still these alternatives are also embodiments within the scope of the disclosed invention. It should be noted that the when fruit juice is used, the fruit juice may be the juice of the same fruit pieces that are being used in a particular bottle or may be only some (when a blend of multiple fruit pieces are used) or may be the same but in different proportions than the fruit pieces are being used in a particular bottle, or may be entirely different than any of the fruit pieces being used in a particular bottle of RTD product, all at the discretion of the manufacturer. Vegetable juices may also be added to or replace the fruit juices. When utilized the vegetable juices are typically chosen from asparagus, eggplants, avocados, beets, broccolis, cabbages, carrots, cauliflowers, celeries, corn, cress, cucumbers, garlic, gourds, kale, leeks, lettuce, mushrooms, onions, peas, sweet peppers, pumpkins, radish, spinach, squash, sweet potato, tomatoes, water chestnuts, yam, and zucchini. Typically, when vegetable juices are used, they are used in replacement of a portion of the fruit juices and in ratios of 2 to 1, 1.5 to 1, 1 to 1, 1 to 1.5 or 1 to 2 of vegetable juice:(fruit juice or other liquid phase material).

Cold brewed tea uses water rather than previously prepared hot-brewed tea. The water can be any suitable water source, inclusive of, without limitation, tap water, spring water, or purified water (such as, without limitation, deionized water, reverse osmosis water, and distilled water). The water is preferably filtered, but if a purified water, need not necessarily be filtered. Nonetheless, it is preferred to filter the water as a means to eliminate any extraneous unintended matter from being inadvertently introduced into the product. The water may be held in and dispensed from a holding container, the holding container being optionally maintained at a predetermined temperature or the holding container need not be maintained at any particular temperature if the water being dispensed therefrom is changed to its preferred temperature between leaving the holding container and being placed in contact with the dry tea leaves intended for use in the cold-brewing process. The determination of the optimal temperature for each tea for use in cold-brewing is known to those of ordinary skill in the art in the tea brewing art and is a tea-by-tea determination. Typically, the water temperature does not exceed 25° C. and is generally a temperature selected within the range of 1° C. to 25° C., such as ranges having endpoints selected from 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., such as:

(a) 1° C. to 25° C., 2° C. to 25° C., 3° C. to 25° C., 4° C. to 25° C., 5° C. to 25° C., 6° C. to 25° C., 7° C. to 25° C., 8° C. to 25° C., 9° C. to 25° C., 10° C. to 25° C., 11° C. to 25° C., 12° C. to 25° C., 13° C. to 25° C., 14° C. to 25° C., 15° C. to 25° C., 16° C. to 25° C., 17° C. to 25° C., 18° C. to 25° C., 19° C. to 25° C., 20° C. to 25° C., 21° C. to 25° C., 22° C. to 25° C., 23° C. to 25° C., 24° C. to 25° C.;

(b) 4° C. to 21° C., 5° C. to 21° C., 6° C. to 21° C., 7° C. to 21° C., 8° C. to 21° C., 9° C. to 21° C., 10° C. to 21° C. 11° C. to 21° C., 12° C. to 21° C., 13° C. to 21° C., 14° C. to 21° C., 15° C. to 21° C., 16° C. to 21° C., 17° C. to 21° C., 18° C. to 21° C., 19° C. to 21° C., 20° C. to 21° C.;

(c) 7° C. to 18° C., 8° C. to 18° C., 9° C. to 18° C., 10° C. to 18° C., 11° C. to 18° C., 12° C. to 18° C., 13° C. to 18° C., 14° C. to 18° C., 15° C. to 18° C., 16° C. to 18° C., 17° C. to 18° C.;

(d) 10° C. to 15° C., 11° C. to 15° C., 12° C. to 15° C., 13° C. to 15° C., and 14° C. to 15° C.

The high pressure process step of the various embodiments of the invention utilizes High-Pressure Processing equipment known in the art and comprises applying pressure of about 200-700 MPa to the filled final container bottles (for example, without limitation, a range of pressures selected from those ranges having a lower end of the range and an upper end of the range each selected from 200 MPa, 250 MPa, 300 MPa, 350 MPa, 400 MPa, 500 Mpa, 550 MPa, 600 MPa, 650 MPa, and 700 MPa, provided the upper end of each range is greater than the lower end of each range); more particularly, without limitation:

(a) 200 MPa to 700 MPa, 250 MPa to 700 MPa, 300 MPa to 700 MPa, 350 MPa to 700 MPa, 400 MPa to 700 MPa, 450 MPa to 700 MPa, 500 Mpa to 700 MPa, 550 MPa to 700 MPa, 600 MPa to 700 MPa, 650 MPa to 700 MPa;

(b) 200 MPa to 650 MPa, 250 MPa to 650 MPa, 300 MPa to 650 MPa, 350 MPa to 650 MPa, 400 MPa to 650 MPa, 450 MPa to 650 MPa, 500 Mpa to 650 MPa, 550 MPa to 650 MPa, 600 MPa to 650 MPa;

(c) 200 MPa to 600 MPa, 250 MPa to 600 MPa, 300 MPa to 600 MPa, 350 MPa to 600 MPa, 400 MPa to 600 MPa, 450 MPa to 600 MPa, 500 Mpa to 600 MPa, 550 MPa to 600 MPa;

(d) 200 MPa to 550 MPa, 250 MPa to 550 MPa, 300 MPa to 550 MPa, 350 MPa to 550 MPa, 400 MPa to 550 MPa, 450 MPa to 550 MPa, 500 Mpa to 550 MPa;

(e) 200 MPa to 500 MPa, 250 MPa to 500 MPa, 300 MPa to 500 MPa, 350 MPa to 500 MPa, 400 MPa to 500 MPa, 450 MPa to 500 MPa;

(f) 200 MPa to 450 MPa, 250 MPa to 450 MPa, 300 MPa to 450 MPa, 350 MPa to 450 MPa, 400 MPa to 450 MPa;

(g) 200 MPa to 400 MPa, 250 MPa to 400 MPa, 300 MPa to 400 MPa, 350 MPa to 400 MPa;

(h) 200 MPa to 350 MPa, 250 MPa to 350 MPa, 300 MPa to 350 MPa;

(i) 200 MPa to 300 MPa, 250 MPa to 300 MPa; and (j) 200 MPa to 250 MPa.

A preferred pressure being selected from the range of 450 MPa to 550 MPa, even more preferred being about 500 MPa. The pressure is applied for 1 minute to 5 minutes, without heating. More specifically, the pressure may be applied for a time range where the upper end of the range and the lower end of the range are each selected from the group 1 minute, 1.5 minutes, 2 minutes, 2.5 minutes, 3 minutes, 3.5 minutes, 4 minutes, 4.5 minutes and 5 minutes, provided the upper end of the range is larger than the lower end of the range. More specifically the pressure is applied for a time range selected from the group consisting of:

(a) 1 minute to 5 minutes, 1.5 minutes to 5 minutes, 2 minutes to 5 minutes, 2.5 minutes to 5 minutes, 3 minutes to 5 minutes, 3.5 minutes to 5 minutes, 4 minutes to 5 minutes, 4.5 minutes to 5 minutes;

(b) 1 minute to 4.5 minutes, 1.5 minutes to 4.5 minutes, 2 minutes to 4.5 minutes, 2.5 minutes to 4.5 minutes, 3 minutes to 4.5 minutes, 3.5 minutes to 4.5 minutes, 4 minutes to 4.5 minutes;

(c) 1 minute to 4 minutes, 1.5 minutes to 4 minutes, 2 minutes to 4 minutes, 2.5 minutes to 4 minutes, 3 minutes to 4 minutes, 3.5 minutes to 4 minutes;

(d) 1 minute to 3.5 minutes, 1.5 minutes to 3.5 minutes, 2 minutes to 3.5 minutes, 2.5 minutes to 3.5 minutes, 3 minutes to 3.5 minutes;

(e) 1 minute to 3 minutes, 1.5 minutes to 3 minutes, 2 minutes to 3 minutes, 2.5 minutes to 3 minutes;

(f) 1 minute to 2.5 minutes, 1.5 minutes to 2.5 minutes, 2 minutes to 2.5 minutes;

(g) 1 minute to 2 minutes, 1.5 minutes to 2 minutes; and (h) 1 minute to 1.5 minutes; with 2.5 minutes to 3.5 minutes being preferred and about 3 minutes being highly preferred.

As stated above, heating is not used, and any suitable low temperature (non-heated or cooled temperature above freezing may be used, such as between about 1° C. to about 25° C.; more particularly operating at a temperature range selected from those ranges having an upper limit and a lower limit (provide the upper limit in each range is greater than the lower limit of such range) selected from 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., or 25° C., or ambient temperature, more specifically a range selected from the group consisting of (a) 1° C. to 25° C., 2° C. to 25° C., 3° C. to 25° C., 4° C. to 25° C., 5° C. to 25° C., 6° C. to 25° C., 7° C. to 25° C., 8° C. to 25° C., 9° C. to 25° C., 10° C. to 25° C., 11° C. to 25° C., 12° C. to 25° C., 13° C. to 25° C., 14° C. to 25° C., 15° C. to 25° C., 16° C. to 25° C., 17° C. to 25° C., 18° C. to 25° C., 19° C. to 25° C., 20° C. to 25° C., 21° C. to 25° C., 22° C. to 25° C., 23° C. to 25° C., 24° C. to 25° C.;

(b) 1° C. to 24° C., 2° C. to 24° C., 3° C. to 24° C., 4° C. to 24° C., 5° C. to 24° C., 6° C. to 24° C., 7° C. to 24° C., 8° C. to 24° C., 9° C. to 24° C., 10° C. to 24° C., 11° C. to 24° C., 12° C. to 24° C., 13° C. to 24° C., 14° C. to 24° C., 15° C. to 24° C., 16° C. to 24° C., 17° C. to 24° C., 18° C. to 24° C., 19° C. to 24° C., 20° C. to 24° C., 21° C. to 24° C., 22° C. to 24° C., 23° C. to 24° C.;

(c) 1° C. to 23° C., 2° C. to 23° C., 3° C. to 23° C., 4° C. to 23° C., 5° C. to 23° C., 6° C. to 23° C., 7° C. to 23° C., 8° C. to 23° C., 9° C. to 23° C., 10° C. to 23° C., 11° C. to 23° C., 12° C. to 23° C., 13° C. to 23° C., 14° C. to 23° C., 15° C. to 23° C., 16° C. to 23° C., 17° C. to 23° C., 18° C. to 23° C., 19° C. to 23° C., 20° C. to 23° C., 21° C. to 23° C., 22° C. to 23° C.;

(d) 1° C. to 22° C., 2° C. to 22° C., 3° C. to 22° C., 4° C. to 22° C., 5° C. to 22° C., 6° C. to 22° C., 7° C. to 22° C., 8° C. to 22° C., 9° C. to 22° C., 10° C. to 22° C., 11° C. to 22° C., 12° C. to 22° C., 13° C. to 22° C., 14° C. to 22° C., 15° C. to 22° C., 16° C. to 22° C., 17° C. to 22° C., 18° C. to 22° C., 19° C. to 22° C., 20° C. to 22° C., 21° C. to 22° C.;

(e) 1° C. to 21° C. 2° C. to 21° C., 3° C. to 21° C. 4° C. to 21° C., 5° C. to 21° C., 6° C. to 21° C. 7° C. to 21° C. 8° C. to 21° C., 9° C. to 21° C., 10° C. to 21° C., 11° C. to 21° C., 12° C. to 21° C., 13° C. to 21° C., 14° C. to 21° C., 15° C. to 21° C., 16° C. to 21° C., 17° C. to 21° C., 18° C. to 21° C., 19° C. to 21° C., 20° C. to 21° C.;

(f) 1° C. to 20° C., 2° C. to 20° C., 3° C. to 20° C., 4° C. to 20° C., 5° C. to 20° C., 6° C. to 20° C., 7° C. to 20° C., 8° C. to 20° C., 9° C. to 20° C., 10° C. to 20° C., 11° C. to 20° C., 12° C. to 20° C., 13° C. to 20° C., 14° C. to 20° C., 15° C. to 20° C., 16° C. to 20° C., 17° C. to 20° C., 18° C. to 20° C., 19° C. to 20° C.;

(g) 1° C. to 19° C., 2° C. to 19° C., 3° C. to 19° C., 4° C. to 19° C., 5° C. to 19° C., 6° C. to 19° C., 7° C. to 19° C., 8° C. to 19° C., 9° C. to 19° C., 10° C. to 19° C., 11° C. to 19° C., 12° C. to 19° C., 13° C. to 19° C., 14° C. to 19° C., 15° C. to 19° C., 16° C. to 19° C., 17° C. to 19° C., 18° C. to 19° C.;

(h) 1° C. to 18° C., 2° C. to 18° C., 3° C. to 18° C., 4° C. to 18° C., 5° C. to 18° C., 6° C. to 18° C., 7° C. to 18° C., 8° C. to 18° C., 9° C. to 18° C., 10° C. to 18° C., 11° C. to 18° C., 12° C. to 18° C., 13° C. to 18° C., 14° C. to 18° C., 15° C. to 18° C., 16° C. to 18° C., 17° C. to 18° C.;

(i) 1° C. to 17° C., 2° C. to 17° C., 3° C. to 17° C., 4° C. to 17° C., 5° C. to 17° C., 6° C. to 17° C., 7° C. to 17° C., 8° C. to 17° C., 9° C. to 17° C., 10° C. to 17° C., 11° C. to 17° C., 12° C. to 17° C., 13° C. to 17° C., 14° C. to 17° C., 15° C. to 17° C., 16° C. to 17° C.;

(j) 1° C. to 16° C., 2° C. to 16° C., 3° C. to 16° C., 4° C. to 16° C., 5° C. to 16° C., 6° C. to 16° C., 7° C. to 16° C., 8° C. to 16° C., 9° C. to 16° C., 10° C. to 16° C., 11° C. to 16° C., 12° C. to 16° C., 13° C. to 16° C., 14° C. to 16° C., 15° C. to 16° C.;

(k) 1° C. to 15° C., 2° C. to 15° C., 3° C. to 15° C., 4° C. to 15° C., 5° C. to 15° C., 6° C. to 15° C., 7° C. to 15° C., 8° C. to 15° C., 9° C. to 15° C., 10° C. to 15° C., 11° C. to 15° C., 12° C. to 15° C., 13° C. to 15° C., 14° C. to 15° C.;

(l) 1° C. to 14° C., 2° C. to 14° C., 3° C. to 14° C., 4° C. to 14° C., 5° C. to 14° C., 6° C. to 14° C., 7° C. to 14° C., 8° C. to 14° C., 9° C. to 14° C., 10° C. to 14° C., 11° C. to 14° C., 12° C. to 14° C., 13° C. to 14° C.;

(m) 1° C. to 13° C., 2° C. to 13° C., 3° C. to 13° C., 4° C. to 13° C., 5° C. to 13° C., 6° C. to 13° C., 7° C. to 13° C., 8° C. to 13° C., 9° C. to 13° C., 10° C. to 13° C., 11° C. to 13° C., 12° C. to 13° C.;

(n) 1° C. to 12° C., 2° C. to 12° C., 3° C. to 12° C., 4° C. to 12° C., 5° C. to 12° C., 6° C. to 12° C., 7° C. to 12° C., 8° C. to 12° C., 9° C. to 12° C. 10° C. to 12° C., 11° C. to 12° C.;

(o) 1° C. to 11° C., 2° C. to 11° C. 3° C. to 11° C., 4° C. to 11° C., 5° C. to 11° C., 6° C. to 11° C., 7° C. to 11° C. 8° C. to 11° C., 9° C. to 11° C., 10° C. to 11° C.;

(p) 1° C. to 10° C., 2° C. to 10° C., 3° C. to 10° C., 4° C. to 10° C., 5° C. to 10° C., 6° C. to 10° C., 7° C. to 10° C., 8° C. to 10° C., 9° C. to 10° C.;

(q) 1° C. to 9° C., 2° C. to 9° C., 3° C. to 9° C., 4° C. to 9° C., 5° C. to 9° C., 6° C. to 9° C., 7° C. to 9° C., 8° C. to 9° C.;

(r) 1° C. to 8° C., 2° C. to 8° C., 3° C. to 8° C., 4° C. to 8° C., 5° C. to 8° C., 6° C. to 8° C., 7° C. to 8° C.;

(s) 1° C. to 7° C., 2° C. to 7° C., 3° C. to 7° C., 4° C. to 7° C., 5° C. to 7° C., 6° C. to 7° C.;

(t) 1° C. to 6° C., 2° C. to 6° C., 3° C. to 6° C., 4° C. to 6° C., 5° C. to 6° C.;

(u) 1° C. to 5° C., 2° C. to 5° C., 3° C. to 5° C., 4° C. to 5° C.;

(v) 1° C. to 4° C., 2° C. to 4° C., 3° C. to 4° C.;

(w) 1° C. to 3° C., 2° C. to 3° C.; and (x) 1° C. to 2° C.; with ambient temperatures (generally 18° C. to 25° C.) being preferred as being less reliant on cooling, although controlled temperatures are preferred to control for day to day and season to season and place to place variations.

An HPP unit having a capacity of 750 liters can accommodate batches of as much as 2000 individual 354 ml (12 ounce) bottles. Higher capacity equipment is needed for larger batch sizes, or where larger volume bottles are used without appropriately reducing the batch size. Adjustments of batch size and bottle size in proportional fashion are well known to those of ordinary skill in the art with respect to a particular capacity unit of equipment. Smaller equipment is possible when the batch size is reduced or the size of the containers being processed is reduced below 354 ml (12 fluid ounces).

The HPP treated final product may be stored at about 1° to 7° C., such as 5° C. in order to obtain the best shelf-life possible. Storage can be at higher temperatures as far as 25° C. at the cost of slightly shorter shelf life periods, and the choice of the particular storage temperature is a calculus balancing the shortened shelf life vs the cost savings in avoiding refrigeration costs involved. Nonetheless, regardless of how the storage is in actual practice, for purposes of determining the shelf life to see whether a product is within the claims or not, one utilizes samples that have been stored at 1° C. to 7° C., most preferably at 5° C.

In any of the various embodiments of the invention, when a "hard" (i.e. alcoholic) variation is desired, a suitable portion of the liquid phase may be replaced with ethanol or an alcoholic containing known ingestible fluid, such as for example, without limitation, vodka, rum, gin, a wine, a cordial or any of the other alcoholic fluids mentioned hereinbefore. When such is desired, the replacement is made at the stage of the introduction of the liquid phase into the final container bottle or earlier in the preparation of the liquid phase. For any volume of alcoholic fluid used, a corresponding volume of water, tea, milk, and/or juice is omitted so that the total volume of the liquid components remains unchanged.

Figure 3:
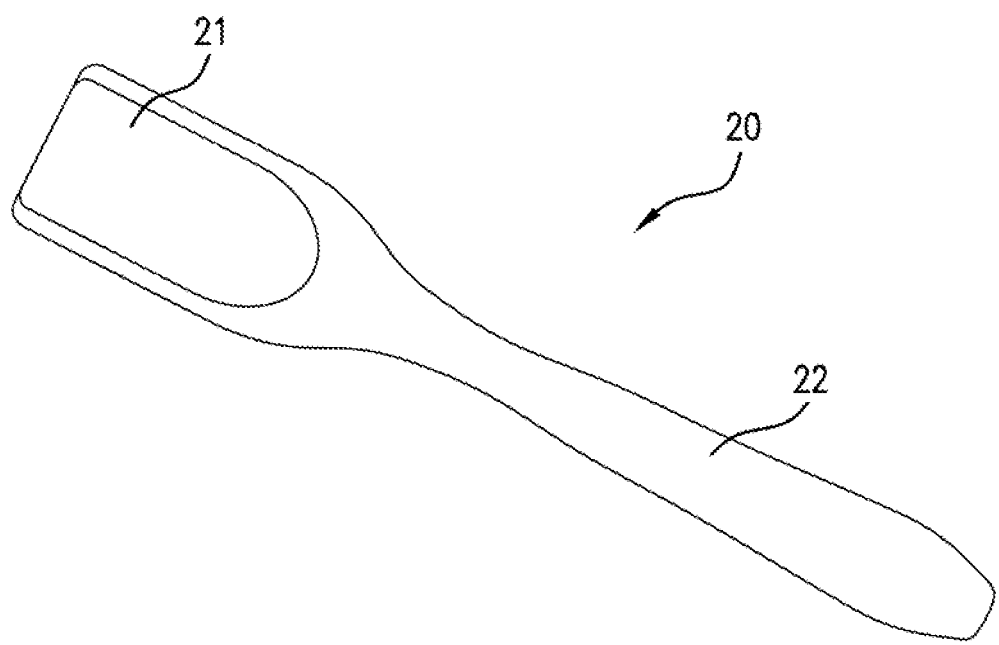
FIG. 3 is a top plan view of a tea inserter for use in a filling step of an embodiment of the invention.
Figure 4:
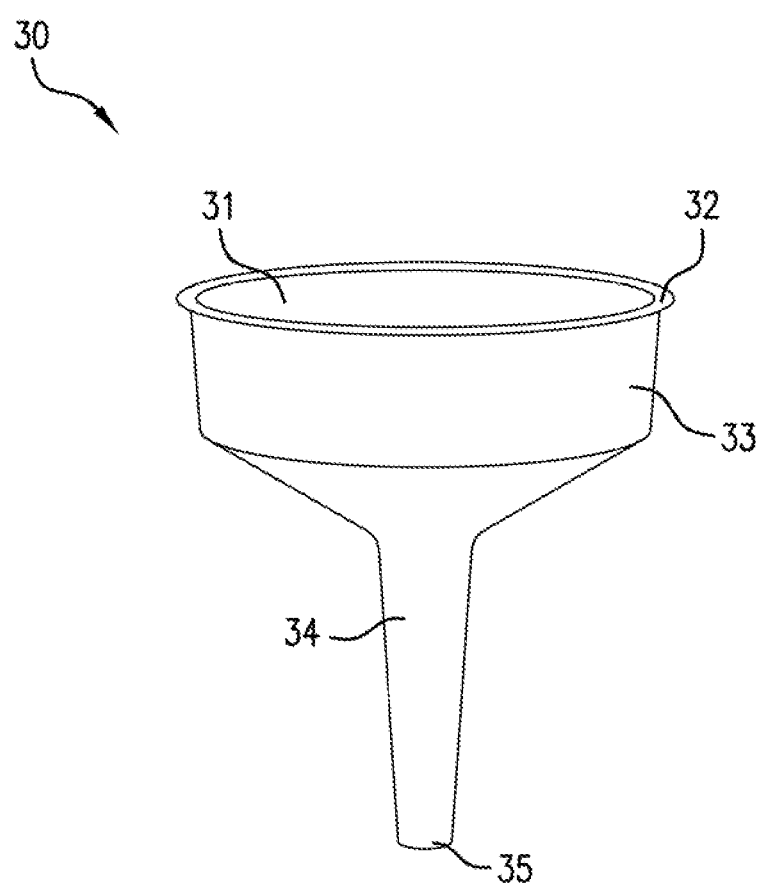
FIG. 4 is a perspective view of a funnel for use in a filling step of an embodiment of the invention.

Referring now to FIGS. 1 through 5, FIG. 1 illustrates a 6 bottle by 8 bottle crate (1) for use in one manner of transporting bottles in a beverage manufacturing method according to an embodiment of the present invention between (a) a filling station to place the solid pieces into the bottles and (b) a second filling station to place the liquid phase into the bottles. As shown, the crate (1) has a base (5) and sidewalls (2, 4) and has compartments (3) for receiving each bottle. FIG. 2 illustrates a sifting spoon (10) which is used in one manner of manually draining liquid from boba for insertion into the final container bottles in some embodiments of the invention, having a wide end with holes/slots (13) for draining boba and a handle (12) with an aperture (11) for hanging when not in use. The shapes and dimensions of the holes (13) are not particularly limited and may be round or other shapes, provided that the diameter or length of the holes is smaller than that of the solid foods that it is used to drain. In embodiments where it is not important to drain the boba or the fruit pieces, the holes/slots are not needed and can be done away with. In an alternative embodiment, the boba and fruit pieces can be drained using a colander having appropriately sized holes so as to retain the desired sized boba and allow the fluid associated therewith to drain away. Other alternative draining means in the art may be used in place of the slotted spoon or colander as desired. When slotted spoons or colanders or other drainage means are used for either the boba or the fruit pieces/slices, the size of the holes through which the fluid can drain may be the same or different in connection with boba or in connection with each different fruit, with each hole maximum size dictated by the size of the boba or fruit respectively. Allowing the openings to be as large as possible, allows the quicker and more effective drainage. However, in all cases the holes cannot be so large as to allow pieces/slices of fruit to not be retained. FIG. 3 illustrates a tea leaf insertion spoon (20) for use in some manual embodiments of the invention for inserting small amounts of dried tea leaves into the final container bottles with respect to cold brewed products of the invention. Insertion spoon (20) has a handle (22) having a scoop (21) at one end for inserting tea leaves into a bottle. As shown in FIG. 4, a funnel (30) for use in the solids insertion step comprises a main compartment (33) with a wide mouth (32) at a first end (31) with a tapered tube (34) and a narrow opening at a second end (35).

Figure 5:
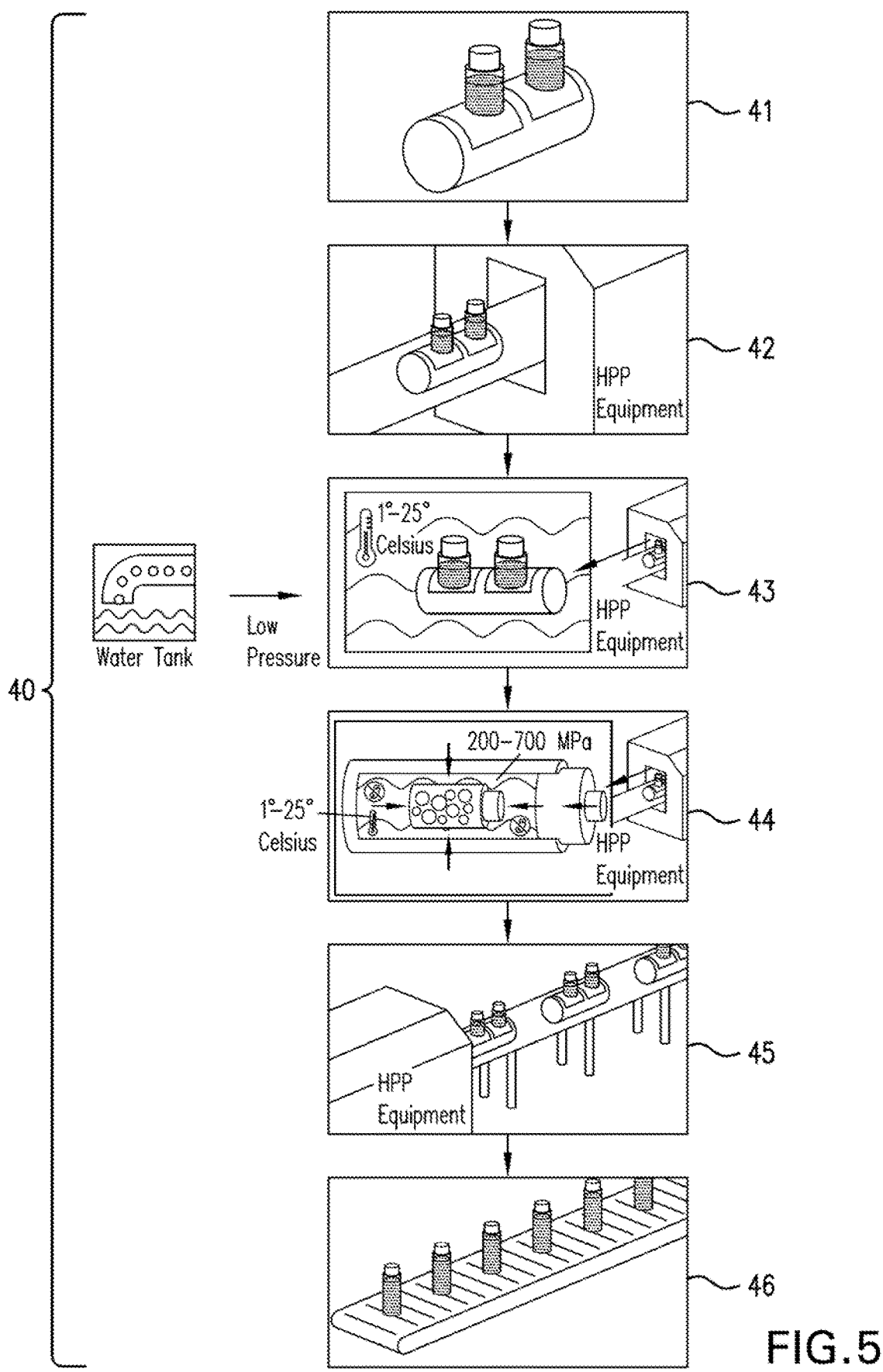
FIG. 5 is a schematic view the steps in a high-pressure sterilization step according to an embodiment of the invention process of manufacture.

FIG. 5 schematically illustrates the steps of processing the bottle contents using a high-pressure processing line (40). Once the bottles have been cleaned, the solids have been inserted, and the bottles have been filled and capped, they may be placed into an HPP container (41) and loaded into an HPP apparatus (42). The HPP container (41) holds several bottles simultaneously. Each operation of the HPP step may be of single type of RTD product, or may be of multiple products in a single operation batch. However, if different products are included in the same single batch operation, there must be some manner of recognition of which product is which when the operation is concluded. Such identification can be by segregating the multiple bottles of each product into discreet areas within the HPP unit or by labeling which identifies the particular product in each bottle before the HPP process has begun. The chamber of the high-pressure processing apparatus is filled with bottles to be processed, the chamber is closed and is filled with water at low pressure (a portion of the water filling the chamber may be inserted into the chamber before the bottles in the HPP container (41) are introduced into the HPP processing chamber) from an adjacent water tank (43). The chamber is pressurized (44), compressing the contents. After a predetermined time, pressure is reduced and the HPP container (41) containing processed beverage bottles is unloaded from the high-pressure processing apparatus (45). The processed bottles are removed from the HPP container (41) and moved towards a final packaging station (46).

It should be recognized that the Ready-to-Drink solids containing products (RTDSCs) of the present invention differ in their final composition from the corresponding freshly prepared products and from the corresponding products that are attempted to be sterilized by radiation (UV or gamma), ultrafiltration, or heat sterilization in that the HPP process results in a different set of extracted principals being in the liquid component of the RTDSC than that present in the freshly prepared corresponding drink made from the same components and from the corresponding products that are attempted to be sterilized by non-HPP methods, in at least one of (a)-(c), at least one of (d)-(f), at least one of (g)-(i), and at least one of (j)-(l), respectively:

(a) certain extractants from the solid pieces (boba, fruit, tea leaves) are present in the liquid phase of the RTDSC of the invention that are not present in the liquid phase in the freshly prepared counterpart;

(b) certain extractants from the solid pieces (boba, fruit, tea leaves) are not present in the liquid phase of the RTDSC of the invention that are present in the liquid phase in the freshly prepared counterpart;

(c) certain extractants from the solid pieces (boba, fruit, tea leaves) are present in the liquid phase of the RTDSC of the invention in a different concentration than that present in the liquid phase in the freshly prepared counterpart;

(d) certain extractants from the solid pieces (boba, fruit, tea leaves) are present in the liquid phase of the RTDSC of the invention that are not present in the liquid phase of corresponding product sterilized by UV radiation, or gamma radiation;

(e) certain extractants from the solid pieces (boba, fruit, tea leaves) are not present in the liquid phase of the RTDSC of the invention that are present in the liquid phase of corresponding product sterilized by UV radiation, or gamma radiation;

(f) certain extractants from the solid pieces (boba, fruit, tea leaves) are present in the liquid phase of the RTDSC of the invention in a different concentration than that present in the liquid phase of the corresponding product sterilized by UV radiation, or gamma radiation;

(g) certain extractants from the solid pieces (boba, fruit, tea leaves) are present in the liquid phase of the RTDSC of the invention that are not present in the liquid phase of corresponding product sterilized by ultrafiltration;

(h) certain extractants from the solid pieces (boba, fruit, tea leaves) are not present in the liquid phase of the RTDSC of the invention that are present in the liquid phase of corresponding product sterilized by ultrafiltration;

(i) certain extractants from the solid pieces (boba, fruit, tea leaves) are present in the liquid phase of the RTDSC of the invention in a different concentration than that present in the liquid phase of the corresponding product sterilized by ultrafiltration;

(j) certain extractants from the solid pieces (boba, fruit, tea leaves) are present in the liquid phase of the RTDSC of the invention that are not present in the liquid phase of corresponding product sterilized by a heat sterilization process;

(k) certain extractants from the solid pieces (boba, fruit, tea leaves) are not present in the liquid phase of the RTDSC of the invention that are present in the liquid phase of corresponding product sterilized by a heat sterilization process;

(l) certain extractants from the solid pieces (boba, fruit, tea leaves) are present in the liquid phase of the RTDSC of the invention in a different concentration than that present in the liquid phase of the corresponding product sterilized a heat sterilization process.

The following statements recite particularly preferred embodiments of the invention I. A ready-to-drink solids-containing (RTDSC) beverage product production method
wherein said RTDSC beverage product comprises a solid component and a liquid component;
said production method comprising
a) filling a container, in any order, with said solid component and said liquid component to result in a first unsealed filled container;
b) sealing said container with said solid component and said liquid component contained within said container to result in an initial first sealed container;
c) subjecting said initial first sealed container to a High-Pressure-Processing (HPP) operation to result in a second sealed container;
said container being selected from containers compatible with an HPP operation in which said initial first sealed container:

(i) is capable of remaining sealed during said HPP operation,
(ii) is capable of transmitting compressive force during said HPP operation to the liquid component and the solid component contained therein; and
(iii) is capable of recovering its shape when with release of the pressure applied during the HPP operation;

which method results in said RTDSC beverage product; and said RTDSC beverage product has a shelf-life of at least 30 days from manufacture when said RTDSC beverage product remains sealed and is stored at a temperature of 1-7° C.

II. The RTDSC beverage product method of Statement I wherein said solid component is selected from at least one member selected from the group consisting of a tea leaf, an herbal tea leaf, a crystal boba, fruit pieces/slices, and mixtures thereof, optionally containing additional solid ingestible materials.

III. The RTDSC beverage product method of Statement I wherein said crystal boba are selected from konjac based boba, agar based boba, and mixtures thereof.

IV. The RTDSC beverage product method of Statement I wherein said solid component is a mixture
(a) of at least two different types of a single member, which single member is selected from the group consisting of a tea leaf, an herbal tea leaf, a crystal boba, and fruit pieces/slices, or
(b) of at least two different members selected from the group consisting of a tea leaf, an herbal tea leaf, a crystal boba, and fruit pieces/slices,
each optionally further containing additional solid ingestible components.

V. The RTDSC beverage product method of Statement I wherein the liquid component is selected from at least one member of the group consisting of (a) zero, one or more waters, (b) zero, one or more of previously prepared teas as prepared from tea leaves, herbal tea leaves, plant branches, plant stems, plant roots, or other beverages commonly known in the marketplace as "teas," (c) zero, one, or more fruit juices, (d) zero, one, or more fruit purees, (e) zero, one, or more edible plant saps, (f) zero, one, or more dairy milk-type fluids, (g) zero, one, or more non-animal ingestible plant milks, (h) zero, one, or more ingestible alcoholic fluids, (i) a coffee and (j) mixtures thereof.

VI. The RTDSC beverage product method of Statement V wherein the liquid component is selected from
(a) said water or a blend of said waters;
(b) said previously prepared tea being from a single type of tea or being prepared from a tea blend;
(c) said previously prepared herbal tea being from a single type of herbal tea or being prepared from an herbal tea blend;
(d) said previously prepared tea being prepared from a mixture of one or more teas and one or more herbal teas;
(e) said fruit juice or blend of fruit juices;
(f) said fruit puree or a blend of fruit purees;
(g) an edible sap or a blend of edible plant saps;
(h) said dairy milk type fluid or a blend of dairy milk type fluids;
(i) said non-animal ingestible plant milk or a blend of non-animal ingestible pant milks;
(j) said ingestible alcoholic fluid or a blend of ingestible alcoholic fluids;
(k) mixtures one or more of (b), (c), (d) above together with one of more of (h), (i), above;
(l) mixtures of one or more of (b), (c), (d) above together with one or more of (e), (f), (g) above;
(m) mixtures of (a) or (g) with any of (b), (c), (d), (e), (f), (h), (i);
(n) mixtures of (j) with any of (1) one or more of (a), (g); (2) one or more of (b), (c), (d); (3) one or more of (e), (f); (4) one or more of (h), (i) or
(o) mixtures of an ingestible vegetable juice and any of (a) to (n) above.

VII. The RTDSC beverage product method of Statement I wherein said HPP compatible container is a polyethylene terephthalate (PET), PP (polypropylene), PE (polyethylene), HDPE (high-density polyethylene), LDPE (low-density polyethylene), APET (amorphous polyethylene terephthalate), or CPET (crystallized polyethylene) container having a wall thickness from 0.1 to 0.9 mm thick, and is of a size selected from 180 ml to 500 ml capacity.

VIII. The RTDSC beverage product method of Statement I wherein said HPP operation is carried out utilizing an HPP pressure selected from pressures of 200 MPa to 700 MPa; at an HPP operating temperature of 1° C. to 25° C.; for a time period selected from 1 minute to 5 minutes duration.

IX. The RTDSC beverage product produced by the process of Statement I.

X. A ready-to-drink solids-containing (RTDSC) beverage product wherein said RTDSC beverage product comprises a solid component and a liquid component;

said RTDSC beverage product having a shelf-life of at least 30 days from manufacture when said RTDSC beverage product remains sealed and is stored at a temperature of 1-7° C., wherein
(i) said solid component is selected from at least one member selected from the group consisting of
(a) a tea leaf,
(b) an herbal tea leaf,
(c) a crystal boba,
(d) fruit pieces/slices, and mixtures thereof, said RTDSC beverage optionally containing additional solid ingestible materials; and
(ii) the liquid component is selected from at least one member selected from the group consisting of
(a) a water or a blend of waters;
(b) a previously prepared tea being from a single type of tea or being prepared from a tea blend;
(c) a previously prepared herbal tea being from a single type of herbal tea or being prepared from an herbal tea blend;
(d) a previously prepared tea being prepared from a mixture of one or more teas and one or more herbal teas;
(e) a fruit juice or blend of fruit juices;
(f) a fruit puree or a blend of fruit purees;
(g) an edible plant sap or a blend of edible plant saps;
(h) a dairy milk type fluid or a blend of dairy milk type fluids;
(i) a non-animal ingestible plant milk or a blend of non-animal ingestible pant milks;
(j) an ingestible alcoholic fluid or a blend of ingestible alcoholic fluids;
(k) mixtures one or more of (b), (c), (d) above together with one of more of (h), (i), above;
(l) mixtures of one or more of (b), (c), (d) above together with one or more of (e), (f), (g) above;

(m) mixtures of (a) or (g) with any of (b), (c), (d), (e), (f), (h), (i);
(n) mixtures of (j) with any of (1) one or more of (a), (g); (2) one or more of (b), (c), (d); (3) one or more of (e), (f); (4) one or more of (h), (i) and
(o) mixtures of an ingestible vegetable juice and any of (a) to (n) above.

XI. The method of Statement I, the product of Statement IX, or the product of Statement X wherein the shelf life is selected from the group consisting of at least 60 days, at least 90 days, at least 120 days, at least 150 days, at least 180 days as determined by a test for Colony Forming Units (CFU) returning a result of less than $1\times10^6$/ml.

XII. The method of Statement I, the product of Statement IX, or the product of Statement X wherein the shelf life is selected from the group consisting of 60 days, 90 days, 120 days, 150 days, and 180 days as determined by a test for Colony Forming Units (CFU) returning a result of less than $1\times10^6$/ml on day 60 or later for a 60 day shelf life, on day 90 or later for a 90 day shelf life, on day 120 for a 120 day shelf life, on day 150 for a 150 day shelf life, or on day 180 or later for a 180 day shelf life, while a CFU/ml result of $1\times10^6$ CFU/ml or more determined on a day greater than 60 days shall not negate an earlier result of less than $1\times10^6$ CFU/ml with respect to a 60 day shelf life, a CFU/ml result of $1\times10^6$ CFU/ml or more determined on a day greater than 90 days shall not negate an earlier result of less than $1\times10^6$ CFU/ml with respect to a 90 day shelf life, a CFU/ml result of $1\times10^6$ CFU/ml or more determined on a day greater than 90 days shall not negate an earlier result of less than $1\times10^6$ CFU/ml with respect to a 90 day shelf life, a CFU/ml result of $1\times10^6$ CFU/ml or more determined on a day greater than 120 days shall not negate an earlier result of less than $1\times10^6$ CFU/ml with respect to a 120 day shelf life, a CFU/ml result of $1\times10^6$ CFU/ml or more determined on a day greater than 150 days shall not negate an earlier result of less than $1\times10^6$ CFU/ml with respect to a 150 day shelf life, and a CFU/ml result of $1\times10^6$ CFU/ml or more determined on a day greater than 180 days shall not negate an earlier result of less than $1\times10^6$ CFU/ml with respect to a 180 day shelf life.

It should be understood, of course, that the foregoing relates to exemplary embodiments of the invention and that modifications may be made without departing from the spirit and scope of the invention as set forth in the following claims.

EXAMPLES

The following examples exemplify, but do not limit, the present invention.

Example 1A—Advanced Preparation of Hot Brew Tea 3.67 kg of dried tea leaves (or blend of tea leaves) of choice are placed in a brewing container to which 223 kg of 80° C. filtered water is added. The tea leaves are allowed to remain in contact with the 80° C. filtered water for 15 minutes to yield a brewed tea. The tea leaves are then separated from the brewed tea and transferred (a) to a holding container for later use in filling final containers or (b) directly into a filling machine for filling final containers.

Examples 1B—1AA

In Examples 1B through 1AA, the same procedure as used in Example 1A is followed except that the variations in the parameters set forth in the table below are used instead:

| Example # | Wt of Tea leaves | Volume of Water | Type of Water | Brewing Temperature | Brewing Time |
|---|---|---|---|---|---|
| 1B | 1.50 kg | 223 kg | filtered | 80° C. | 15 min |
| 1C | 6.30 kg | 223 kg | filtered | 80° C. | 15 min |
| 1D | 1.50 kg | 223 kg | filtered | 65° C. | 15 min |
| 1E | 3.67 kg | 223 kg | filtered | 65° C. | 15 min |
| 1F | 6.30 kg | 223 kg | filtered | 65° C. | 15 min |
| 1G | 1.50 kg | 223 kg | filtered | 93° C. | 15 min |
| 1H | 3.67 kg | 223 kg | filtered | 93° C. | 15 min |
| 1I | 6.30 kg | 223 kg | filtered | 93° C. | 15 min |
| 1J | 1.50 kg | 223 kg | filtered | 65° C. | 5 min |
| 1K | 3.67 kg | 223 kg | filtered | 65° C. | 5 min |
| 1L | 6.30 kg | 223 kg | filtered | 65° C. | 5 min |
| 1M | 1.50 kg | 223 kg | filtered | 80° C. | 5 min |
| 1N | 3.67 kg | 223 kg | filtered | 80° C. | 5 min |
| 1O | 6.30 kg | 223 kg | filtered | 80° C. | 5 min |
| 1P | 1.50 kg | 223 kg | filtered | 93° C. | 5 min |
| 1Q | 3.67 kg | 223 kg | filtered | 93° C. | 5 min |
| 1R | 6.30 kg | 223 kg | filtered | 93° C. | 5 min |
| 1S | 1.50 kg | 223 kg | filtered | 65° C. | 23 min |
| 1T | 3.67 kg | 223 kg | filtered | 65° C. | 23 min |
| 1U | 6.30 kg | 223 kg | filtered | 65° C. | 23 min |
| 1V | 1.50 kg | 223 kg | filtered | 80° C. | 23 min |
| 1W | 3.67 kg | 223 kg | filtered | 80° C. | 23 min |
| 1X | 6.30 kg | 223 kg | filtered | 80° C. | 23 min |
| 1Y | 1.50 kg | 223 kg | filtered | 93° C. | 23 min |
| 1Z | 3.67 kg | 223 kg | filtered | 93° C. | 23 min |
| 1AA | 6.30 kg | 223 kg | filtered | 93° C. | 23 min |

Example 2A—Advanced Preparation of a Cold Brewed Tea 50 g of suitable dried tea leaves or blends thereof are placed into a High Pressure Processing suitable container to which 3.54 liters of filtered water is added. The container is sealed and placed into a High Pressure Processing device and subjected to a pressure 500 MPa for 3 minutes. The so treated material may then be used as a base tea for combining with solid pieces (boba and/or fruit pieces) and optionally other components.

Example 2B-2CC

In Examples 2B through 2CC, the same procedure as used in Example 2A is followed except that the variations in the parameters set forth in the table below are used instead:

| Example # | Weight of Tea leaves | Volume of Water | Type of Water | HPP Pressure | HPP Exposure Time | HPP operation Temperature |
|---|---|---|---|---|---|---|
| 2B | 20 g | 3540 ml | Filtered | 200 MPa | 1 min | 1° C. |
| 2C | 30 g | 3540 ml | Filtered | 200 MPa | 1 min | 1° C. |
| 2D | 40 g | 3540 ml | Filtered | 200 MPa | 1 min | 1° C. |
| 2E | 50 g | 3540 ml | Filtered | 200 MPa | 1 min | 1° C. |

-continued

| Example # | Weight of Tea leaves | Volume of Water | Type of Water | HPP Pressure | HPP Exposure Time | HPP operation Temperature |
|---|---|---|---|---|---|---|
| 2F | 60 g | 3540 ml | Filtered | 200 MPa | 1 min | 1° C. |
| 2G | 70 g | 3540 ml | Filtered | 200 MPa | 1 min | 1° C. |
| 2H | 80 g | 3540 ml | Filtered | 200 MPa | 1 min | 1° C. |
| 2I | 90 g | 3540 ml | Filtered | 200 MPa | 1 min | 1° C. |
| 2J | 100 g | 3540 ml | Filtered | 200 MPa | 1 min | 1° C. |
| 2K | 20 g | 3540 ml | Filtered | 500 MPa | 1 min | 1° C. |
| 2L | 30 g | 3540 ml | Filtered | 500 MPa | 1 min | 1° C. |
| 2M | 40 g | 3540 ml | Filtered | 500 MPa | 1 min | 1° C. |
| 2N | 50 g | 3540 ml | Filtered | 500 MPa | 1 min | 1° C. |
| 2O | 60 g | 3540 ml | Filtered | 500 MPa | 1 min | 1° C. |
| 2P | 70 g | 3540 ml | Filtered | 500 MPa | 1 min | 1° C. |
| 2Q | 80 g | 3540 ml | Filtered | 500 MPa | 1 min | 1° C. |
| 2R | 90 g | 3540 ml | Filtered | 500 MPa | 1 min | 1° C. |
| 2S | 100 g | 3540 ml | Filtered | 500 MPa | 1 min | 1° C. |
| 2T | 20 g | 3540 ml | Filtered | 700 MPa | 1 min | 1° C. |
| 2U | 30 g | 3540 ml | Filtered | 700 MPa | 1 min | 1° C. |
| 2V | 40 g | 3540 ml | Filtered | 700 MPa | 1 min | 1° C. |
| 2W | 50 g | 3540 ml | Filtered | 700 MPa | 1 min | 1° C. |
| 2X | 60 g | 3540 ml | Filtered | 700 MPa | 1 min | 1° C. |
| 2Y | 70 g | 3540 ml | Filtered | 700 MPa | 1 min | 1° C. |
| 2Z | 80 g | 3540 ml | Filtered | 700 MPa | 1 min | 1° C. |
| 2AB | 90 g | 3540 ml | Filtered | 700 MPa | 1 min | 1° C. |
| 2AC | 100 g | 3540 ml | Filtered | 700 MPa | 1 min | 1° C. |
| 2AD | 20 g | 3540 ml | Filtered | 200 MPa | 3 min | 1° C. |
| 2AE | 30 g | 3540 ml | Filtered | 200 MPa | 3 min | 1° C. |
| 2AF | 40 g | 3540 ml | Filtered | 200 MPa | 3 min | 1° C. |
| 2AG | 50 g | 3540 ml | Filtered | 200 MPa | 3 min | 1° C. |
| 2AH | 60 g | 3540 ml | Filtered | 200 MPa | 3 min | 1° C. |
| 2AI | 70 g | 3540 ml | Filtered | 200 MPa | 3 min | 1° C. |
| 2AJ | 80 g | 3540 ml | Filtered | 200 MPa | 3 min | 1° C. |
| 2AK | 90 g | 3540 ml | Filtered | 200 MPa | 3 min | 1° C. |
| 2AL | 100 g | 3540 ml | Filtered | 200 MPa | 3 min | 1° C. |
| 2AM | 20 g | 3540 ml | Filtered | 500 MPa | 3 min | 1° C. |
| 2AN | 30 g | 3540 ml | Filtered | 500 MPa | 3 min | 1° C. |
| 2AO | 40 g | 3540 ml | Filtered | 500 MPa | 3 min | 1° C. |
| 2AP | 50 g | 3540 ml | Filtered | 500 MPa | 3 min | 1° C. |
| 2AQ | 60 g | 3540 ml | Filtered | 500 MPa | 3 min | 1° C. |
| 2AR | 70 g | 3540 ml | Filtered | 500 MPa | 3 min | 1° C. |
| 2AS | 80 g | 3540 ml | Filtered | 500 MPa | 3 min | 1° C. |
| 2AT | 90 g | 3540 ml | Filtered | 500 MPa | 3 min | 1° C. |
| 2AU | 100 g | 3540 ml | Filtered | 500 MPa | 3 min | 1° C. |
| 2AV | 20 g | 3540 ml | Filtered | 700 MPa | 3 min | 1° C. |
| 2AW | 30 g | 3540 ml | Filtered | 700 MPa | 3 min | 1° C. |
| 2AX | 40 g | 3540 ml | Filtered | 700 MPa | 3 min | 1° C. |
| 2AY | 50 g | 3540 ml | Filtered | 700 MPa | 3 min | 1° C. |
| 2AZ | 60 g | 3540 ml | Filtered | 700 MPa | 3 min | 1° C. |
| 2BA | 70 g | 3540 ml | Filtered | 700 MPa | 3 min | 1° C. |
| 2BB | 80 g | 3540 ml | Filtered | 700 MPa | 3 min | 1° C. |
| 2BC | 90 g | 3540 ml | Filtered | 700 MPa | 3 min | 1° C. |
| 2BD | 100 g | 3540 ml | Filtered | 700 MPa | 3 min | 1° C. |
| 2BE | 20 g | 3540 ml | Filtered | 200 MPa | 5 min | 1° C. |
| 2BD | 30 g | 3540 ml | Filtered | 200 MPa | 5 min | 1° C. |
| 2BE | 40 g | 3540 ml | Filtered | 200 MPa | 5 min | 1° C. |
| 2BF | 50 g | 3540 ml | Filtered | 200 MPa | 5 min | 1° C. |
| 2BG | 60 g | 3540 ml | Filtered | 200 MPa | 5 min | 1° C. |
| 2BH | 70 g | 3540 ml | Filtered | 200 MPa | 5 min | 1° C. |
| 2BI | 80 g | 3540 ml | Filtered | 200 MPa | 5 min | 1° C. |
| 2BJ | 90 g | 3540 ml | Filtered | 200 MPa | 5 min | 1° C. |
| 2BK | 100 g | 3540 ml | Filtered | 200 MPa | 5 min | 1° C. |
| 2BL | 20 g | 3540 ml | Filtered | 500 MPa | 5 min | 1° C. |
| 2BM | 30 g | 3540 ml | Filtered | 500 MPa | 5 min | 1° C. |
| 2BN | 40 g | 3540 ml | Filtered | 500 MPa | 5 min | 1° C. |
| 2BO | 50 g | 3540 ml | Filtered | 500 MPa | 5 min | 1° C. |
| 2BP | 60 g | 3540 ml | Filtered | 500 MPa | 5 min | 1° C. |
| 2BQ | 70 g | 3540 ml | Filtered | 500 MPa | 5 min | 1° C. |
| 2BR | 80 g | 3540 ml | Filtered | 500 MPa | 5 min | 1° C. |
| 2BS | 90 g | 3540 ml | Filtered | 500 MPa | 5 min | 1° C. |
| 2BT | 100 g | 3540 ml | Filtered | 500 MPa | 5 min | 1° C. |
| 2BU | 20 g | 3540 ml | Filtered | 700 MPa | 5 min | 1° C. |
| 2BV | 30 g | 3540 ml | Filtered | 700 MPa | 5 min | 1° C. |
| 2BW | 40 g | 3540 ml | Filtered | 700 MPa | 5 min | 1° C. |
| 2BX | 50 g | 3540 ml | Filtered | 700 MPa | 5 min | 1° C. |
| 2BY | 60 g | 3540 ml | Filtered | 700 MPa | 5 min | 1° C. |
| 2BZ | 70 g | 3540 ml | Filtered | 700 MPa | 5 min | 1° C. |
| 2CA | 80 g | 3540 ml | Filtered | 700 MPa | 5 min | 1° C. |

-continued

| Example # | Weight of Tea leaves | Volume of Water | Type of Water | HPP Pressure | HPP Exposure Time | HPP operation Temperature |
|---|---|---|---|---|---|---|
| 2CB | 90 g | 3540 ml | Filtered | 700 MPa | 5 min | 1° C. |
| 2CC | 100 g | 3540 ml | Filtered | 700 MPa | 5 min | 1° C. |

Example 3

Examples 2A-2CC are repeated except that in each case the HPP processing temperature is as set forth in the table below:

| Example # | HPP operation temperature |
|---|---|
| 3A | 3° C. |
| 3B | 5° C. |
| 3C | 7° C. |
| 3D | 10° C. |
| 3E | 15° C. |
| 3F | 18° C. |
| 3G | 19° C. |
| 3H | 20° C. |
| 3I | 21° C. |
| 3J | 22° C. |
| 3K | 23° C. |
| 3L | 24° C. |

Example 4—Non-HPP Cold Brewed Tea Advanced Preparation 5 kg of suitable dried tea leaves or blends thereof are placed in a porous bag in a clear container to which 354 liters of filtered water is added. The container is sealed and placed in direct sunlight for a natural extraction of the tea principals into the water, after which the tea leaves are removed from the liquid which can then be used as a base tea liquid phase.

Example 5—Crystal Boba Preparation 50 g of crystal commercially available boba soaking in its packaging liquid suspension is removed from its main container. The liquid suspension may be drained, using an apparatus similar to that described in FIG. 2. The liquid suspension may also remain undrained, depending on the particular SKUs specifications. The crystal boba is then placed into the HPP compliant container with the assistance of a funnel similar to that pictured in FIG. 4.

Example 6—Fruit Slice/Solid Piece Preparation

Fruits are first washed. Fruits can be peeled or (in the case of fruits with edible skin, such as apples, pears, plums, peaches, apricots, etc.) unpeeled, depending on the specifications of the SKU. Fruits are cut into pieces no less than 5 mm and no more than 25 mm on all dimensions. An appropriate amount of such cut fruit, depending on the specifications of the SKU, are inserted into the HPP compliant container with the assistance of a funnel similar to that pictured in FIG. 4.

Example 7—Final Product Container (Bottle) Pre-Filling Preparation

All final container bottles, regardless of size are suitable for transmitting pressure to its contents under an HPP operation, and therefore are preferably polyethylene terephthalate (PET). The bottles are cleaned under aseptic conditions at a temperature of less than 5° C. (but above freezing) and relative humidity of 40%. The bottles are washed multiple times, typically twice, with disinfectant solution and water (once each time). The washed bottles are then blown dry with purified and disinfected air. Once dry, the bottles can be used for filling with product components.

Example 8—Filling of Bottles with Solid Pieces (Fruit and/or Crystal Boba and/or Dried Tea Leaves Example 8 A—Filling with Crystal Boba Insert an appropriately sized funnel into the neck of a previously cleaned appropriately sized standing bottle. Using a sifter of appropriate configurations (preferably a sifting spoon) having openings smaller in size than the minimum desired boba size, remove 12-100 g of the boba (previously prepared) and allow the liquid portions accompanying the removed boba to drain, typically resulting in about 10-80 g of crystal boba after draining. The removed, drained boba can then be added to the bottle through the funnel. The funnel is removed and the so filled bottle can be moved to an appropriate liquid filling station.

Example 8B—Filling with Solid Fruit Pieces/Slices

Insert an appropriately sized funnel into the neck of a previously cleaned appropriately sized standing bottle. Using a sifter of appropriate configurations (preferably a sifting spoon) having openings smaller in size than the minimum desired fruit chunk/slice size, remove 12-100 g of the fruit (previously prepared) and allow the liquid portions accompanying the removed fruit to drain. The removed, drained fruit can then be added to the bottle through the funnel. The funnel is removed and the so filled bottle can be moved to an appropriate liquid filling station.

Example 8C—Filling with Dried Tea Leaves for In-Situ Cold Brewing

Insert an appropriately sized funnel into the neck of a previously cleaned appropriately sized standing bottle. Using a spoon designed to hold 1-10 g, transfer 5 g of dried tea leaves through the funnel into the bottle. The bottle with the tea leaves therein is then transferred to a liquid filling station.

Example 8D—Filling with Both Boba and Fruit

Insert an appropriately sized funnel into the neck of a previously cleaned appropriately sized standing bottle. Using a sifter of appropriate configurations (preferably a sifting spoon) having openings smaller in size than the minimum desired boba size, remove up to 10-100 g of the boba (previously prepared) and allow the liquid portions accompanying the removed boba to drain. The removed, drained boba can then be added to the bottle through the funnel. Then the funnel is removed and the so filled bottle is transported to a fruit piece filling station and a second funnel is inserted into the bottle and then up to 10-100 g of fruit pieces/slices (drained of adherent fluid) is added through the second funnel, provided the total of the fruit and boba do not exceed about 150 g, Alternatively, after the addition of the boba, the funnel is not removed until after the fruit is added so that a second funnel is not required. After the addition of both the boba and the fruit, the bottle can be moved to an appropriate liquid filling station. In a second alternative of Example 10D is that the order of the addition of the boba and the addition of the fruit is reversed.

Example 8E Filling with Dried Tea Leaves and One or Both of Boba and Fruit

The end result of Example 8C is used as the starting point in Example 8A to result in a bottle containing tea leaves and boba.

The end result of Example 8C is used as the starting point in Example 8B to result in a bottle containing tea leaves and fruit pieces.

The end result of Example 8C is used as the starting point in Example 8D to result in a bottle containing tea leaves and boba and fruit pieces.

The end result of Example 8A is used as the starting point in Example 8C to result in a bottle containing tea leaves and boba.

The end result of Example 8B is used as the starting point in Example 8C to result in a bottle containing tea leaves and fruit pieces.

The end result of Example 8D is used as the starting point in Example 8C to result in a bottle containing tea leaves and boba and fruit pieces.

Example 9—Liquid Filing of the Containers

Each variant in Example 8 is moved to a liquid filing station with a liquid an appropriate liquid phase leaving not more than 5% of headspace in the container when sealed. The added liquid phases for milk, fruit, and mixed milk/fruit teas are set forth in the table below:

|  | Liquid Phase Components | | | | | | | | |
|---|---|---|---|---|---|---|---|---|---|
|  | Brewed Tea | Milk powder | Milk base | sweetener | Fruit Juice | Fruit pieces | Alcoholic component | Additional flavorings | spices |
| Milk Tea 1 | No | Yes | Yes | Yes | No | No | No | No | No |
| Milk Tea 2 | Yes | Yes | Yes | Yes | No | No | No | No | No |
| Milk Tea 3 | No | Yes | Yes | Yes | No | No | Yes | No | No |
| Milk Tea 4 | Yes | Yes | Yes | Yes | No | No | Yes | No | No |
| Milk Tea 5 | No | Yes | Yes | Yes | No | No | No | Yes | No |
| Milk Tea 6 | Yes | Yes | Yes | Yes | No | No | No | Yes | No |
| Milk Tea 7 | No | Yes | Yes | Yes | No | No | Yes | Yes | No |
| Milk Tea 8 | Yes | Yes | Yes | Yes | No | No | Yes | Yes | No |
| Milk Tea 9 | No | Yes | Yes | Yes | No | No | No | No | Yes |
| Milk Tea 10 | Yes | Yes | Yes | Yes | No | No | No | No | Yes |
| Milk Tea 11 | No | Yes | Yes | Yes | No | No | Yes | No | Yes |
| Milk Tea 12 | Yes | Yes | Yes | Yes | No | No | Yes | No | Yes |
| Milk Tea 13 | No | Yes | Yes | Yes | No | No | No | Yes | Yes |
| Milk Tea 14 | Yes | Yes | Yes | Yes | No | No | No | Yes | Yes |
| Milk Tea 15 | No | Yes | Yes | Yes | No | No | Yes | Yes | Yes |
| Milk Tea 16 | Yes | Yes | Yes | Yes | No | No | Yes | Yes | Yes |
| Fruit Tea 1 | No | No | No | Yes | No | Yes | No | No | No |
| Fruit Tea 2 | Yes | No | No | Yes | No | Yes | No | No | No |
| Fruit Tea 3 | No | No | No | Yes | No | Yes | Yes | No | No |
| Fruit Tea 4 | Yes | No | No | Yes | No | Yes | Yes | No | No |
| Fruit Tea 5 | No | No | No | Yes | No | Yes | No | Yes | No |
| Fruit Tea 6 | Yes | No | No | Yes | No | Yes | No | Yes | No |
| Fruit Tea 7 | No | No | No | Yes | No | Yes | Yes | Yes | No |
| Fruit Tea 8 | Yes | No | No | Yes | No | Yes | Yes | Yes | No |
| Fruit Tea 9 | No | No | No | Yes | No | Yes | No | No | Yes |
| Fruit Tea 10 | Yes | No | No | Yes | No | Yes | No | No | Yes |
| Fruit Tea 11 | No | No | No | Yes | No | Yes | Yes | No | Yes |
| Fruit Tea 12 | Yes | No | No | Yes | No | Yes | Yes | No | Yes |
| Fruit Tea 13 | No | No | No | Yes | No | Yes | No | Yes | Yes |
| Fruit Tea 14 | Yes | No | No | Yes | No | Yes | No | Yes | Yes |
| Fruit Tea 15 | No | No | No | Yes | No | Yes | Yes | Yes | Yes |
| Fruit Tea 16 | Yes | No | No | Yes | No | Yes | Yes | Yes | Yes |
| Fruit Tea 17 | No | No | No | Yes | Yes | Yes | No | No | No |
| Fruit Tea 18 | Yes | No | No | Yes | Yes | Yes | No | No | No |
| Fruit Tea 19 | No | No | No | Yes | Yes | Yes | Yes | No | No |
| Fruit Tea 20 | Yes | No | No | Yes | Yes | Yes | Yes | No | No |
| Fruit Tea 21 | No | No | No | Yes | Yes | Yes | No | Yes | No |
| Fruit Tea 22 | Yes | No | No | Yes | Yes | Yes | No | Yes | No |
| Fruit Tea 23 | No | No | No | Yes | Yes | Yes | Yes | Yes | No |
| Fruit Tea 24 | Yes | No | No | Yes | Yes | Yes | Yes | Yes | No |
| Fruit Tea 25 | No | No | No | Yes | Yes | Yes | No | No | Yes |
| Fruit Tea 26 | Yes | No | No | Yes | Yes | Yes | No | No | Yes |

-continued

| | Liquid Phase Components | | | | | | | |
|---|---|---|---|---|---|---|---|---|
| | Brewed Tea | Milk powder | Milk base | sweetener | Fruit Juice | Fruit pieces | Alcoholic component | Additional flavorings | spices |
| Fruit Tea 27 | No | No | No | Yes | Yes | Yes | Yes | No | Yes |
| Fruit Tea 28 | Yes | No | No | Yes | Yes | Yes | Yes | No | Yes |
| Fruit Tea 29 | No | No | No | Yes | Yes | Yes | No | Yes | Yes |
| Fruit Tea 30 | Yes | No | No | Yes | Yes | Yes | No | Yes | Yes |
| Fruit Tea 31 | No | No | No | Yes | Yes | Yes | Yes | Yes | Yes |
| Fruit Tea 32 | Yes | No | No | Yes | Yes | Yes | Yes | Yes | Yes |
| Milk and Fruit Tea 1 | No | Yes | Yes | Yes | No | Yes | No | No | No |
| Milk and Fruit Tea 2 | Yes | Yes | Yes | Yes | No | Yes | No | No | No |
| Milk and Fruit Tea 3 | No | Yes | Yes | Yes | No | Yes | Yes | No | No |
| Milk and Fruit Tea 4 | Yes | Yes | Yes | Yes | No | Yes | Yes | No | No |
| Milk and Fruit Tea 5 | No | Yes | Yes | Yes | No | Yes | No | Yes | No |
| Milk and Fruit Tea 6 | Yes | Yes | Yes | Yes | No | Yes | No | Yes | No |
| Milk and Fruit Tea 7 | No | Yes | Yes | Yes | No | Yes | Yes | Yes | No |
| Milk and Fruit Tea 8 | Yes | Yes | Yes | Yes | No | Yes | Yes | Yes | No |
| Milk and Fruit Tea 9 | No | Yes | Yes | Yes | No | Yes | No | No | Yes |
| Milk and Fruit Tea 10 | Yes | Yes | Yes | Yes | No | Yes | No | No | Yes |
| Milk and Fruit Tea 11 | No | Yes | Yes | Yes | No | Yes | Yes | No | Yes |
| Milk and Fruit Tea 12 | Yes | Yes | Yes | Yes | No | Yes | Yes | No | Yes |
| Milk and Fruit Tea 13 | No | Yes | Yes | Yes | No | Yes | No | Yes | Yes |
| Milk and Fruit Tea 14 | Yes | Yes | Yes | Yes | No | Yes | No | Yes | Yes |
| Milk and Fruit Tea 15 | No | Yes | Yes | Yes | No | Yes | Yes | Yes | Yes |
| Milk and Fruit Tea 16 | Yes | Yes | Yes | Yes | No | Yes | Yes | Yes | Yes |
| Milk and Fruit Tea 17 | No | Yes | Yes | Yes | Yes | Yes | No | No | No |
| Milk and Fruit Tea 18 | Yes | Yes | Yes | Yes | Yes | Yes | No | No | No |
| Milk and Fruit Tea 19 | No | Yes | Yes | Yes | Yes | Yes | Yes | No | No |
| Milk and Fruit Tea 20 | Yes | Yes | Yes | Yes | Yes | Yes | Yes | No | No |
| Milk and Fruit Tea 21 | No | Yes | Yes | Yes | Yes | Yes | No | Yes | No |
| Milk and Fruit Tea 22 | Yes | Yes | Yes | Yes | Yes | Yes | No | Yes | No |
| Milk and Fruit Tea 23 | No | Yes | Yes | Yes | Yes | Yes | Yes | Yes | No |
| Milk and Fruit Tea 24 | Yes | Yes | Yes | Yes | Yes | Yes | Yes | Yes | No |
| Milk and Fruit Tea 25 | No | Yes | Yes | Yes | Yes | Yes | No | No | Yes |
| Milk and Fruit Tea 26 | Yes | Yes | Yes | Yes | Yes | Yes | No | No | Yes |
| Milk and Fruit Tea 27 | No | Yes | Yes | Yes | Yes | Yes | Yes | No | Yes |
| Milk and Fruit Tea 28 | Yes | Yes | Yes | Yes | Yes | Yes | Yes | No | Yes |
| Milk and Fruit Tea 29 | No | Yes | Yes | Yes | Yes | Yes | No | Yes | Yes |
| Milk and Fruit Tea 30 | Yes | Yes | Yes | Yes | Yes | Yes | No | Yes | Yes |
| Milk and Fruit Tea 31 | No | Yes | Yes | Yes | Yes | Yes | Yes | Yes | Yes |
| Milk and Fruit Tea 32 | Yes | Yes | Yes | Yes | Yes | Yes | Yes | Yes | Yes |

Each of the foregoing in the above table is used for the cold-brewed tea corresponding beverage products except that water replaces the previously brewed tea.

Example 10—HPP Operation on the Final Product Containers Having the Beverage Therein Each of the sealed final containers prepared in Example 9 is moved to an HPP machine in which the sealed containers are subjected to an HPP operation under the conditions set forth in the table below:

| Example # | HPP Pressure | HPP Exposure Time | HPP operation Temperature |
|---|---|---|---|
| 10A | 200 MPa | 1 min | 1° C. |
| 10B | 500 MPa | 1 min | 1° C. |
| 10C | 700 MPa | 1 min | 1° C. |
| 10D | 200 MPa | 3 min | 1° C. |
| 10E | 500 MPa | 3 min | 1° C. |
| 10F | 700 MPa | 3 min | 1° C. |
| 10G | 200 MPa | 5 min | 1° C. |
| 10H | 500 MPa | 5 min | 1° C. |
| 10I | 700 MPa | 5 min | 1° C. |
| 10J | 200 MPa | 1 min | 3° C. |
| 10K | 500 MPa | 1 min | 3° C. |
| 10L | 700 MPa | 1 min | 3° C. |
| 10M | 200 MPa | 3 min | 3° C. |
| 10N | 500 MPa | 3 min | 3° C. |
| 10O | 700 MPa | 3 min | 3° C. |
| 10P | 200 MPa | 5 min | 3° C. |
| 10Q | 500 MPa | 5 min | 3° C. |
| 10R | 700 MPa | 5 min | 3° C. |
| 10S | 200 MPa | 1 min | 5° C. |
| 10T | 500 MPa | 1 min | 5° C. |
| 10U | 700 MPa | 1 min | 5° C. |
| 10V | 200 MPa | 3 min | 5° C. |
| 10W | 500 MPa | 3 min | 5° C. |
| 10X | 700 MPa | 3 min | 5° C. |
| 10Y | 200 MPa | 5 min | 5° C. |
| 10Z | 500 MPa | 5 min | 5° C. |
| 10AA | 700 MPa | 5 min | 5° C. |
| 10AB | 200 MPa | 1 min | 18° C. |
| 10AC | 500 MPa | 1 min | 18° C. |
| 10AD | 700 MPa | 1 min | 18° C. |
| 10AE | 200 MPa | 3 min | 18° C. |
| 10AF | 500 MPa | 3 min | 18° C. |
| 10AG | 700 MPa | 3 min | 18° C. |
| 10AH | 200 MPa | 1 min | 18° C. |
| 10AI | 500 MPa | 1 min | 18° C. |
| 10AJ | 700 MPa | 1 min | 18° C. |
| 10AK | 200 MPa | 1 min | 20° C. |
| 10AL | 500 MPa | 1 min | 20° C. |
| 10AM | 700 MPa | 1 min | 20° C. |
| 10AN | 200 MPa | 3 min | 20° C. |
| 10AO | 500 MPa | 3 min | 20° C. |
| 10AP | 700 MPa | 3 min | 20° C. |
| 10AQ | 200 MPa | 1 min | 20° C. |
| 10AR | 500 MPa | 1 min | 20° C. |
| 10AS | 700 MPa | 1 min | 20° C. |
| 10AT | 200 MPa | 1 min | 23° C. |
| 10AU | 500 MPa | 1 min | 23° C. |
| 10AV | 700 MPa | 1 min | 23° C. |
| 10AW | 200 MPa | 3 min | 23° C. |
| 10AX | 500 MPa | 3 min | 23° C. |
| 10AY | 700 MPa | 3 min | 23° C. |
| 10AZ | 200 MPa | 1 min | 23° C. |
| 10BA | 500 MPa | 1 min | 23° C. |
| 10BB | 700 MPa | 1 min | 23° C. |

Samples of the products of Example 10 ae taken and immediately tested for microbial content or placed on refrigerated storage (1° C. to 7° C.) for subsequent testing for microbial content at periods of 30 days, 60 days, 90 days, 120 days, 150 days, 180 days post manufacture date. On conducting the testing at days 30, 60, 90, 120, 150, and 180, microbial content is found to be acceptable for product to meet US FDA requirements concerning microbial content with respect to ingestible food products.

Subsequent production batches are subjected to the same storage and microbial testing and can be seen to similarly acceptable Example 11—Shelf Life Samples (i.e. individual sealed containers of product from any particular batch) of the products of Example 10 are taken and placed on refrigerated storage (1° C. to 7° C.) for subsequent testing for microbial content at periods of 0 days, 30 days, 60 days, 90 days, 120 days, 150 days, 180 days post manufacture date. Samples are analyzed for microbial growth using standardized FDA Bacteriological Analytical Manual (BAM) and/or USDA National Advisory Committee on Microbiological Criteria for Foods (NACMCF) guidelines. Each test opens the particular bottle and withdraws 1 ml of the liquid portion and dilutes it with 9 ml of standard nutrient/water (at least 95% water) and then the diluted liquid is placed onto Plate Count Agar plates. Once plated, the plates are closed and then stored for 48 hours at 30° C. At the end of this period, the plates are examined and the number of colonies are determined and the number of Colony Forming Units (CFU) in CFU/ml is determined. A count of $1 \times 10^6$ (i.e. 6 log) or more is considered a failure, while a count of less than $1 \times 10^6$ is considered a pass. Should a sample "fail" at any particular test point, the last conducted test with a pass is considered to be the "best by"/"use by" date for the shelf life. Testing is to be done at least every 30 days, and so if there is a "pass" at 150 days and a failure at 180 days, the shelf life will be considered 150 days, even though the actual shelf life expiration is a date at some point after 150 days and before 180 days.

On conducting the above testing at days 0, 30, 60, 90, 120, 150, and 180, on the Samples taken from products of Example 10, microbial content found to be below 6-log (i.e. is less than $1 \times 10^6$ CFU/ml) is acceptable, and the corresponding date after manufacture is acceptable be set as the shelf life for said product. However, one may choose to take a conservative approach to shelf life by labelling the product for a date shorter than such actual pass dates. In addition, it should be noted that the foregoing test point dates is one example of dates post manufacture that can be set for testing. Any frequency and combination of dates (especially within one year of manufacture) can be used for said products depending on the particular business model for the products at hand.

Subsequent production batches are subjected to the same storage and microbial testing and can be seen to similarly acceptable.

I claim:
1. A ready-to-drink solids-containing (RTDSC) beverage product production method
   wherein said RTDSC beverage product comprises a solid component and a liquid component wherein the solid component comprises at least crystal boba;
   said production method comprising
   a) filling a container, in any order, with said solid component and said liquid component to result in a first unsealed filled container;
   b) sealing said container with said solid component and said liquid component contained within said container to result in an initial first sealed container;

c) subjecting said initial first sealed container to a High-Pressure-Processing (HPP) operation to result in a second sealed container;

wherein said HPP operation is subjecting said initial first sealed container to a pressure of 200 MPa-700 MPa, at a temperature of 1° C.-25° C., for a period of 1 minute-5 minutes;

said container being selected from containers compatible with an HPP operation in which said initial first sealed container:
  (i) is capable of remaining sealed during said HPP operation,
  (ii) is capable of transmitting compressive force during said HPP operation to the liquid component and the solid component contained therein; and
  (iii) is capable of recovering its shape upon release of the pressure applied during the HPP operation;

which method results in said RTDSC beverage product;

wherein said solid component comprises
  I) (a) said crystal boba,
    (b) optionally with or without tea leaves, and/or
    (c) optionally with or without fruit pieces or slices;
  wherein said crystal boba are of a size in the range of from at least 6 mm to 15 mm;
  said fruit pieces and slices have at least one dimension in the range of at least 6 mm to 25 mm and are selected from the group consisting of peach, nectarine, grapefruit, orange, lemon, citron, lime, kiwi, lychee, mango, apricot, passion fruit, papaya, sugar cane, longan, dates, jujube, blueberry, blackberry, raspberry, pear, Asian pear and mixtures thereof.

2. The RTDSC beverage product method of claim 1 wherein said solid component comprises
  said crystal boba,
    (b) optionally with or without said tea leaves, and
    (c) optionally with or without said fruit pieces or slices;
  said crystal boba being selected from konjac based boba, agar based boba, and mixtures thereof;
  said tea leaves, when present, being selected from
    (a) one or more types of non-herbal tea leaves,
    (b) one or more types of herbal tea leaves, and
    (c) mixtures thereof;
  optionally containing additional solid ingestible materials.

3. The RTDSC beverage product method of claim 1 wherein said solid component is a mixture of
  (a) a first type of crystal boba and
    (i) at least one additional crystal boba other than said first type of crystal boba, or
    (ii) at least two different types of a single member, which single member is selected from the group consisting of said non-herbal tea leaf, said herbal tea leaf, and said fruit pieces/slices, or
    (iii) at least two different members selected from the group consisting of said non-herbal tea leaf, said herbal tea leaf, said crystal boba other than said first crystal boba, and said fruit pieces/slices,
  (b) each optionally further containing additional solid ingestible components.

4. The RTDSC beverage product method of claim 1 wherein the liquid component is selected from at least one member of the group consisting of (a) zero, one or more waters, (b) zero, one or more of previously prepared teas as prepared from tea leaves, herbal tea leaves, plant branches, plant stems, plant roots, or other beverages commonly known in the marketplace as "teas," (c) zero, one, or more fruit juices, (d) zero, one, or more fruit purees, (e) zero, one, or more edible plant saps, (f) zero, one, or more dairy milk-type fluids, (g) zero, one, or more non-animal ingestible plant milks, (h) zero, one, or more ingestible alcoholic fluids, (i) a coffee and (j) mixtures thereof, provided that at least one of groups (a) through (j) is other than zero.

5. The RTDSC beverage product method of claim 4 wherein the liquid component is selected from
  (a) said water or a blend of said waters;
  (b) said previously prepared tea being from a single type of tea or being prepared from a tea blend;
  (c) said previously prepared herbal tea being from a single type of herbal tea or being prepared from an herbal tea blend;
  (d) said previously prepared tea being prepared from a mixture of one or more teas and one or more herbal teas;
  (e) said fruit juice or blend of fruit juices;
  (f) said fruit puree or a blend of fruit purees;
  (g) an edible sap or a blend of edible plant saps;
  (h) said dairy milk type fluid or a blend of dairy milk type fluids;
  (i) said non-animal ingestible plant milk or a blend of non-animal ingestible plant milks;
  (j) said ingestible alcoholic fluid or a blend of ingestible alcoholic fluids;
  (k) mixtures of one or more of (b), (c), (d) above together with one of more of (h), (i), above;
  (l) mixtures of one or more of (b), (c), (d) above together with one or more of (e), (f), (g) above;
  (m) mixtures of (a) or (g) with any of (b), (c), (d), (e), (f), (h), (i);
  (n) mixtures of (j) with any of (1) one or more of (a), (g); (2) one or more of (b), (c), (d); (3) one or more of (e), (f); (4) one or more of (h), (i) or
  (o) mixtures of an ingestible vegetable juice and any of (a) to (n) above.

6. The RTDSC beverage product method of claim 1 wherein said HPP compatible container is a polyethylene terephthalate (PET), PP (polypropylene), PE (polyethylene), HDPE (high-density polyethylene), LDPE (low-density polyethylene), APET (amorphous polyethylene terephthalate), or CPET (crystallized polyethylene) container having a wall thickness from 0.1 to 0.9 mm thick, and is of a size selected from 180 ml to 500 ml capacity.

7. The method of claim 1 wherein said RTDSC beverage product has a shelf-life of at least 30 days from manufacture when said RTDSC beverage product remains sealed and is stored at a temperature of 1-7° C.

8. The method of claim 7 wherein said crystal boba retain their shape, texture, chewiness, and flavor from the point of said crystal boba being introduced into said liquid through said shelf-life.

9. The method of claim 7 wherein the shelf life is selected from the group consisting of at least 60 days, at least 90 days, at least 120 days, at least 150 days, at least 180 days.

10. The method of claim 9 wherein said crystal boba retain their shape, texture, chewiness, and flavor from the point of said crystal boba being introduced into said liquid through said selected shelf-life, respectively.

* * * * *